US012706666B2

(12) United States Patent
Mukae

(10) Patent No.: US 12,706,666 B2
(45) Date of Patent: Aug. 11, 2026

(54) EDGE COMPUTING SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 317 days.

(21) Appl. No.: 18/291,229

(22) PCT Filed: Jul. 8, 2022

(86) PCT No.: PCT/JP2022/027089

§ 371 (c)(1),
(2) Date: Jan. 23, 2024

(87) PCT Pub. No.: WO2023/008145

PCT Pub. Date: Feb. 2, 2023

(65) Prior Publication Data

US 2024/0333379 A1 Oct. 3, 2024

(30) Foreign Application Priority Data

Jul. 28, 2021 (JP) ................................ 2021-122915

(51) Int. Cl.
*H04B 7/185* (2006.01)
*H04B 7/19* (2006.01)
*B64G 1/10* (2006.01)

(52) U.S. Cl.
CPC ..... *H04B 7/18547* (2013.01); *H04B 7/18597* (2013.01); *H04B 7/19* (2013.01); *B64G 1/1007* (2013.01)

(58) Field of Classification Search
CPC .. H04B 7/18547; H04B 7/18597; H04B 7/19; H04B 7/185; H04B 7/18521;

(Continued)

(56) References Cited

U.S. PATENT DOCUMENTS 9,356,686 B1 * 5/2016 Mitchell ............ H04B 7/18519
10,447,383 B1 10/2019 Haas, Jr. et al.

(Continued)

FOREIGN PATENT DOCUMENTS

JP 01293300 A * 11/1989
JP 2018-506919 A 3/2018

(Continued)

OTHER PUBLICATIONS

Notice of Reasons for Refusal mailed on Sep. 5, 2023, received for PCT Application 2023-538396, 8 pages including English Translation.

(Continued)

*Primary Examiner* — Curtis A Kuntz
(74) *Attorney, Agent, or Firm* — XSENSUS LLP

(57) ABSTRACT

A cloud computing system includes: a geostationary satellite having a computer and a cloud data center mounted thereon; a low earth orbiting satellite constellation including a plurality of communication satellites; and a ground data center deployed on the ground. In the low earth orbiting satellite constellation, an annular communication network is formed by the ability of each communication satellite of a plurality of communication satellites that fly on the same orbital plane to communicate with front and rear communication satellites in the forwarding direction, and a mesh communication network, in which adjacent annular communication networks are communicably connected with each other, is formed by the ability of the plurality of communication satellites that fly on the same orbital plane to communicate with communication satellites flying in adjacent orbits.

12 Claims, 14 Drawing Sheets

(58) Field of Classification Search
CPC .... H04B 7/195; B64G 1/1007; B64G 1/1021; B64G 1/1085; B64G 1/242; B64G 1/10; B64G 3/00; H04L 45/00; H04W 84/06
See application file for complete search history.

(56) References Cited

U.S. PATENT DOCUMENTS

| | | | | |
|---|---|---|---|---|
| 11,201,939 | B1 * | 12/2021 | Mokashi | H04L 67/568 |
| 2017/0034250 | A1 | 2/2017 | Sobhani et al. | |
| 2017/0195040 | A1 | 7/2017 | Sobhani et al. | |
| 2018/0254824 | A1 * | 9/2018 | Speidel | H04B 7/18532 |
| 2020/0277087 | A1 | 9/2020 | Kaen | |
| 2021/0011148 | A1 * | 1/2021 | Blondel | B64G 1/105 |
| 2021/0036767 | A1 | 2/2021 | Devaraj | |
| 2021/0036772 | A1 | 2/2021 | Miranda et al. | |
| 2021/0258071 | A1 | 8/2021 | Miranda et al. | |
| 2021/0316886 | A1 | 10/2021 | Kaen | |
| 2023/0022164 | A1 | 1/2023 | Devaraj | |
| 2023/0336242 | A1 | 10/2023 | Miranda et al. | |
| 2024/0154690 | A1 | 5/2024 | Devaraj | |
| 2024/0192197 | A1 | 6/2024 | Jiang et al. | |
| 2024/0372605 | A1 | 11/2024 | Devaraj | |
| 2025/0219716 | A1 | 7/2025 | Devaraj | |

FOREIGN PATENT DOCUMENTS

| | | | | |
|---|---|---|---|---|
| JP | 2021-035319 | A | 3/2021 | |
| RU | 2608763 | C2 * | 1/2017 | G01S 13/765 |
| WO | 2016/126888 | A1 | 8/2016 | |
| WO | 2021022253 | A1 | 2/2021 | |
| WO | WO-2021060491 | A1 * | 4/2021 | G06Q 30/0283 |
| WO | 2022072430 | A1 | 4/2022 | |

OTHER PUBLICATIONS

International Search Report and Written Opinion mailed on Sep. 27, 2022, received for PCT Application PCT/JP2022/027089, filed on Jul. 8, 2022, 9 pages including English Translation.
Notice of Reasons for Refusal mailed on Dec. 19, 2023, received for PCT Application 2023-538396, 8 pages including English Translation.
Office Action dated Dec. 23, 2025 for the corresponding JP application No. 2024-076351, 3pp.
Japanese Office Action issued Jul. 8, 2025, in corresponding Japanese Patent Application No. 2024-076351, 7pp.

* cited by examiner

FORWARDING DIRECTION
EARTH DIRECTION
EARTH DIRECTION
NORTHEAST DIRECTION
SOUTHWEST DIRECTION
51C (33)
52C (33)
53C (34)
54C (34)
55C
51C
52C
53C
54C
51
52
53
54
55
30
18
19
X
Y
Z

WEST-SIDE ADJACENT ORBIT
SAME ORBIT
EAST-SIDE ADJACENT ORBIT
TOKYO
72
30
71
71
72
COMMUNICATION LINK 71 BETWEEN FRONT AND REAR SATELLITES ON THE SAME ORBITAL PLANE AND COMMUNICATION LINK 72 BETWEEN SATELLITES IN ADJACENT ORBITS

2
COMPUTER 31 (ARTIFICIAL INTELLIGENCE)
EDGE SERVER 32 (ORBIT INFORMATION 39) (FLYING OBJECT INFORMATION 44)
10: GEOSTATIONARY SATELLITE
COMPUTER 11
SPACE DATA CENTER 13
GEOSTATIONARY ORBIT
90
20, 21, 22
91
ORBIT ROUND THE EARTH
40
SURVEILLANCE SATELLITE (MONITORING DEVICE 41)
COMMUNICATION SATELLITE
30
GROUND DATA CENTER
USER
EARTH
600

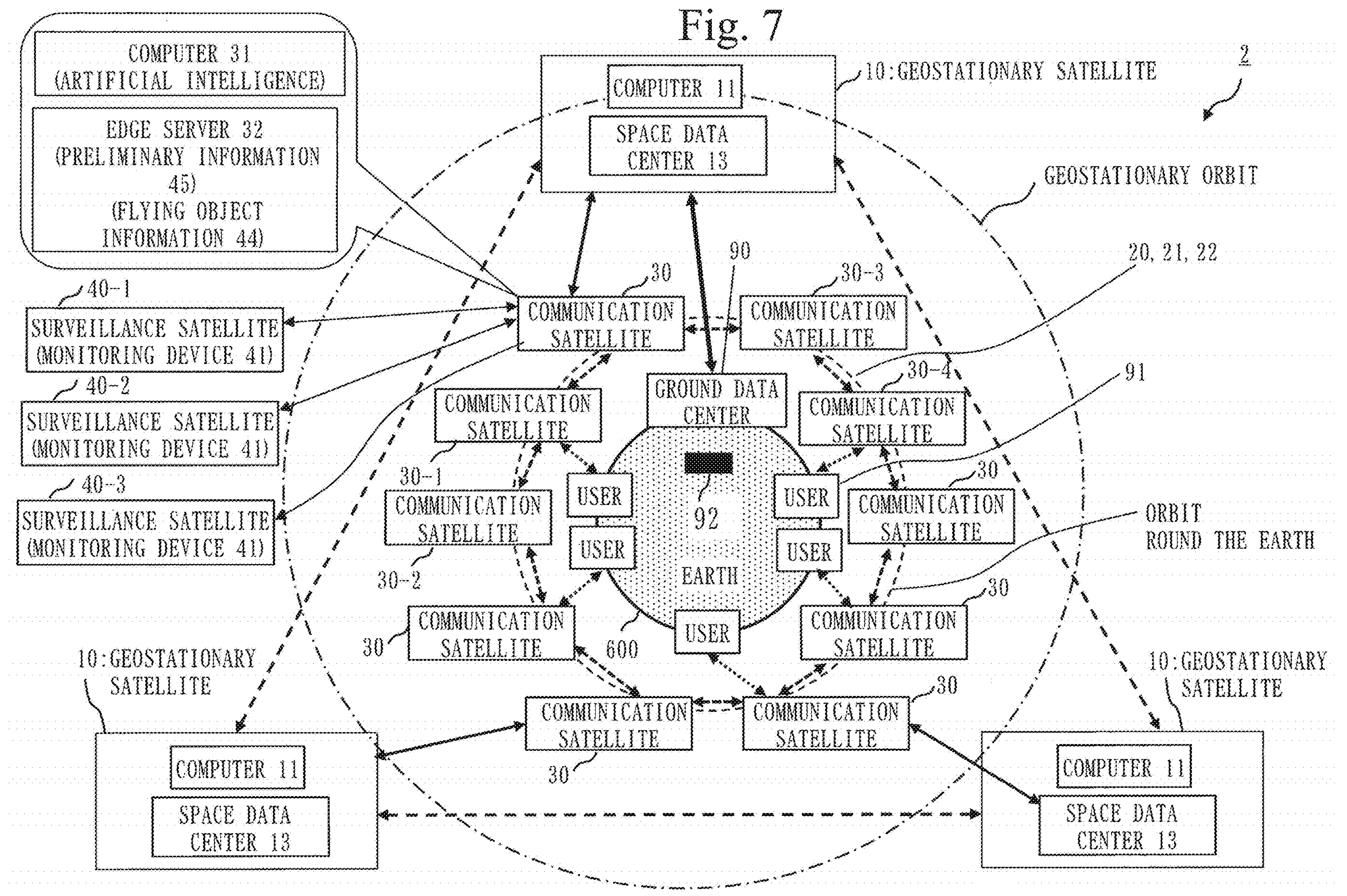
Fig. 7
COMPUTER 31 (ARTIFICIAL INTELLIGENCE)
EDGE SERVER 32 (PRELIMINARY INFORMATION 45) (FLYING OBJECT INFORMATION 44)
COMPUTER 11
SPACE DATA CENTER 13
10:GEOSTATIONARY SATELLITE
2
GEOSTATIONARY ORBIT
40-1
SURVEILLANCE SATELLITE (MONITORING DEVICE 41)
40-2
SURVEILLANCE SATELLITE (MONITORING DEVICE 41)
40-3
SURVEILLANCE SATELLITE (MONITORING DEVICE 41)
30
COMMUNICATION SATELLITE
90
30-3
COMMUNICATION SATELLITE
20, 21, 22
GROUND DATA CENTER
COMMUNICATION SATELLITE
30-1
30-4
COMMUNICATION SATELLITE
91
USER
92
USER
COMMUNICATION SATELLITE
30-2
USER
USER
30
COMMUNICATION SATELLITE
ORBIT ROUND THE EARTH
EARTH
30
COMMUNICATION SATELLITE
600
USER
30
COMMUNICATION SATELLITE
10:GEOSTATIONARY SATELLITE
COMMUNICATION SATELLITE
30
COMMUNICATION SATELLITE
30
10:GEOSTATIONARY SATELLITE
COMPUTER 11
SPACE DATA CENTER 13
COMPUTER 11
SPACE DATA CENTER 13

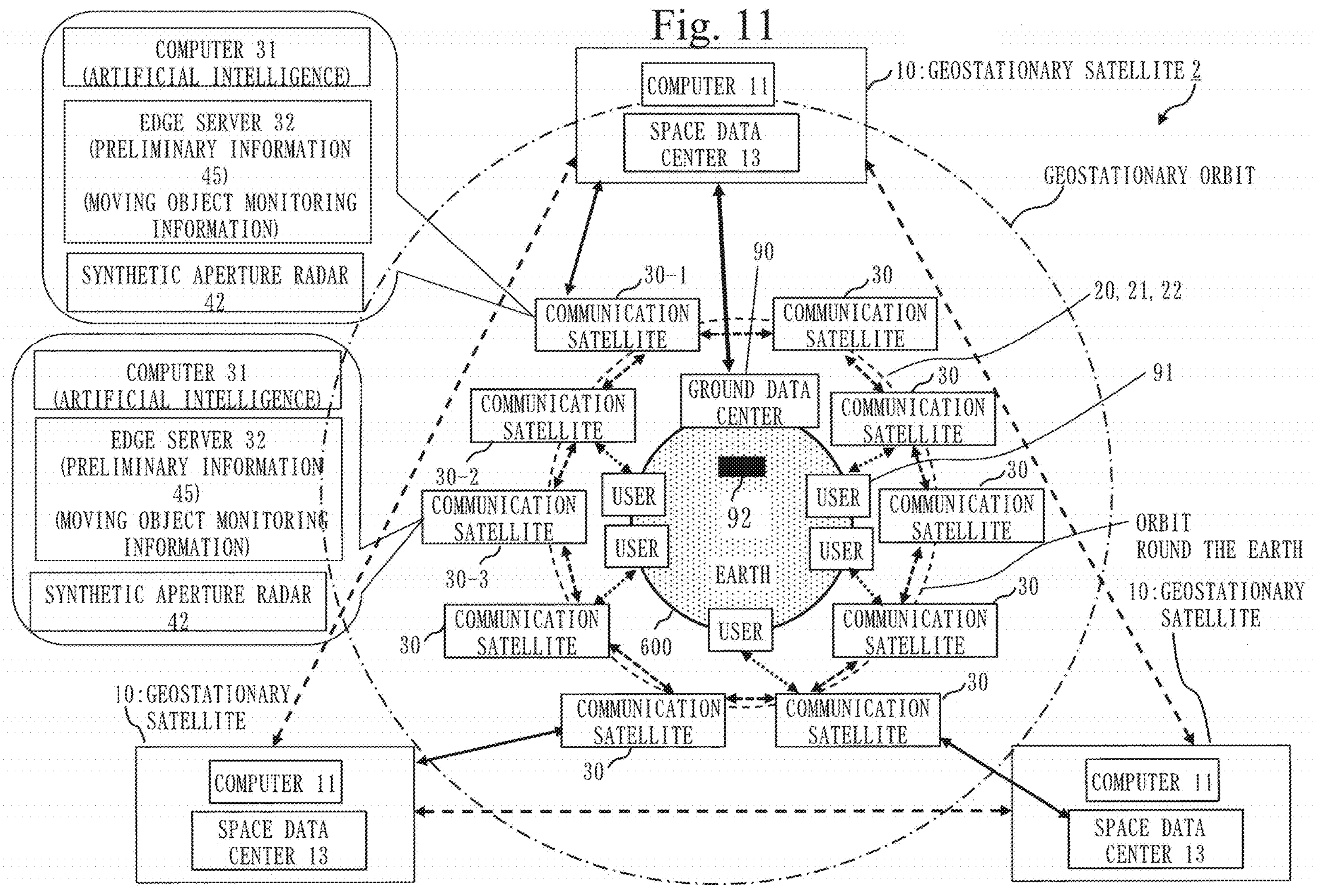
Fig. 11
COMPUTER 31 (ARTIFICIAL INTELLIGENCE)
EDGE SERVER 32 (PRELIMINARY INFORMATION 45) (MOVING OBJECT MONITORING INFORMATION)
SYNTHETIC APERTURE RADAR 42
COMPUTER 31 (ARTIFICIAL INTELLIGENCE)
EDGE SERVER 32 (PRELIMINARY INFORMATION 45) (MOVING OBJECT MONITORING INFORMATION)
SYNTHETIC APERTURE RADAR 42
COMPUTER 11
SPACE DATA CENTER 13
10: GEOSTATIONARY SATELLITE 2
GEOSTATIONARY ORBIT
90
30-1
COMMUNICATION SATELLITE
30
20, 21, 22
GROUND DATA CENTER
91
30-2
30-3
USER
92
EARTH
ORBIT ROUND THE EARTH
10: GEOSTATIONARY SATELLITE
600
10: GEOSTATIONARY SATELLITE
COMPUTER 11
SPACE DATA CENTER 13
COMPUTER 11
SPACE DATA CENTER 13

30: COMMUNICATION SATELLITE
60
SATELLITE
61
SATELLITE CONTROL DEVICE
62
COMMUNICATION DEVICE
63
PROPULSION DEVICE
64
ATTITUDE CONTROL DEVICE
65
POWER SUPPLY DEVICE

Fig. 14

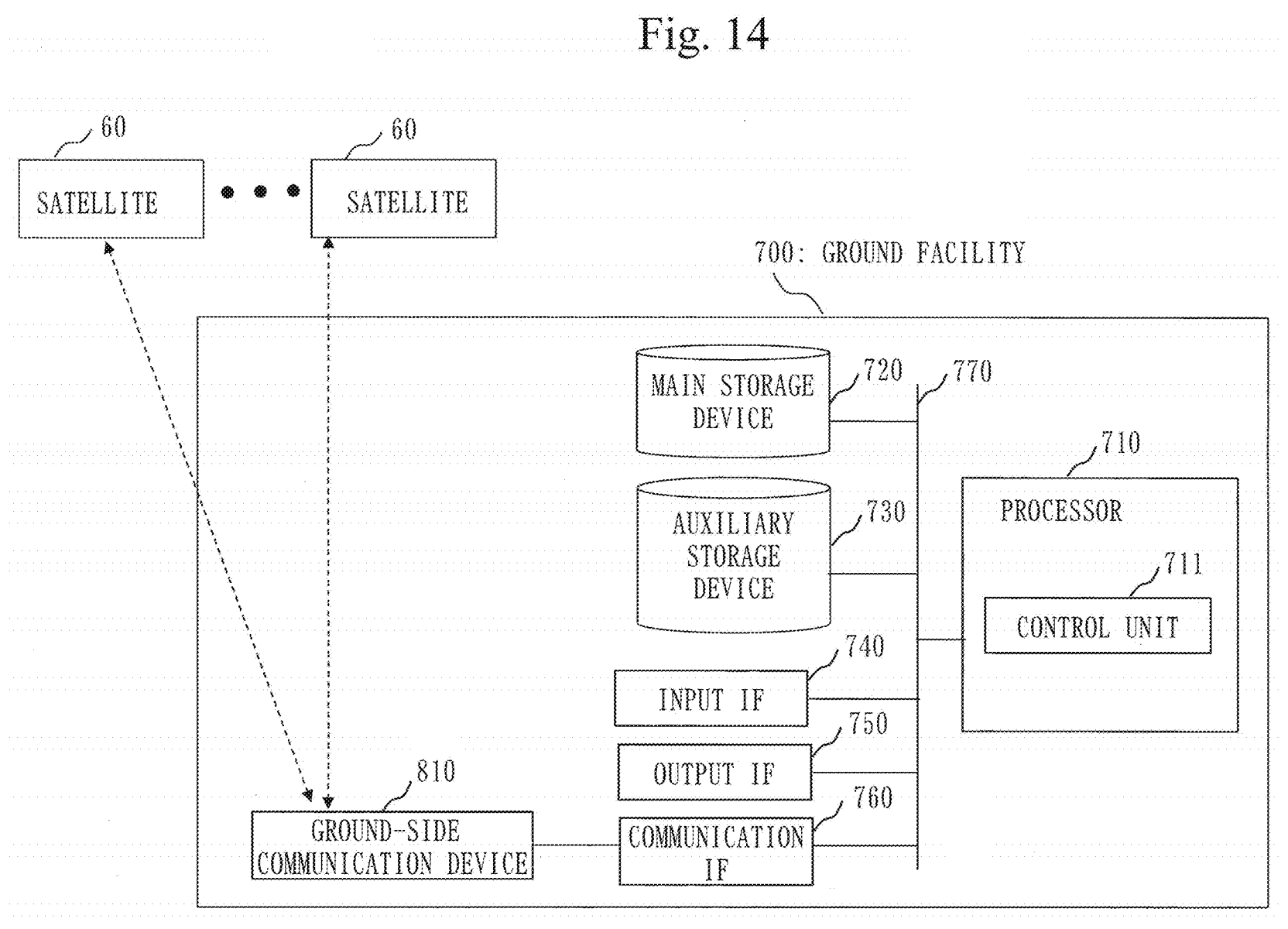

700: GROUND FACILITY
710 PROCESSOR
711 CONTROL UNIT
770
720 MAIN STORAGE DEVICE
730 AUXILIARY STORAGE DEVICE
740 INPUT IF
750 OUTPUT IF
760 COMMUNICATION IF
810 GROUND-SIDE COMMUNICATION DEVICE
60 SATELLITE
60 SATELLITE

EDGE COMPUTING SYSTEM

CROSS-REFERENCE TO RELATED APPLICATION

This application is based on PCT filing PCT/JP2022/027089, filed Jul. 8, 2022, which claims priority from Japanese Patent Application No. 2021-122915, filed Jul. 28, 2021, the entire contents of each are incorporated herein by reference.

TECHNICAL FIELD

The present disclosure relates to a cloud computing system and an edge computing system.

BACKGROUND ART

There are conventional techniques to suppress increase in energy consumption and carbon dioxide emission associated with increasing power consumption and cooling load of both communication equipment and computer systems that are related to high-speed, high-capacity data transmission/reception and high-speed analysis or complex arithmetic processing on a large amount of data (for example, Abstract of Patent Literature 1).

Patent Literature 1 does not mention a technique to suppress increase in power consumption and increase in cooling load in view of both the ground and outer space.

CITATION LIST

Patent Literature

Patent Literature 1: JP 2021-035319

SUMMARY OF INVENTION

Technical Problem

An object of the present disclosure is to present techniques for suppressing increase in power consumption and increase in cooling load in view of both the ground and outer space.

Solution to Problem

A cloud computing system according to the present disclosure includes:

a geostationary satellite having a computer and a cloud data center mounted thereon;

a low earth orbiting satellite constellation including a plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, and the low earth orbiting satellite constellation is a communication satellite constellation.

Advantageous Effects of Invention

According to the present disclosure, techniques for suppressing increase in power consumption and increase in cooling load in view of both the ground and outer space can be provided.

BRIEF DESCRIPTION OF DRAWINGS

FIG. 7 is a diagram of Embodiment 1, showing a state where a low earth orbiting satellite constellation 20 of the edge computing system 2 is capable of communicating with surveillance satellites 40.

FIG. 11 is a diagram of Embodiment 1, showing a configuration in which the edge computing system 2 monitors a moving object.

FIG. 14 is a diagram of Embodiment 1, showing a hardware configuration of a ground facility 700.

DESCRIPTION OF EMBODIMENTS

Figure 1:
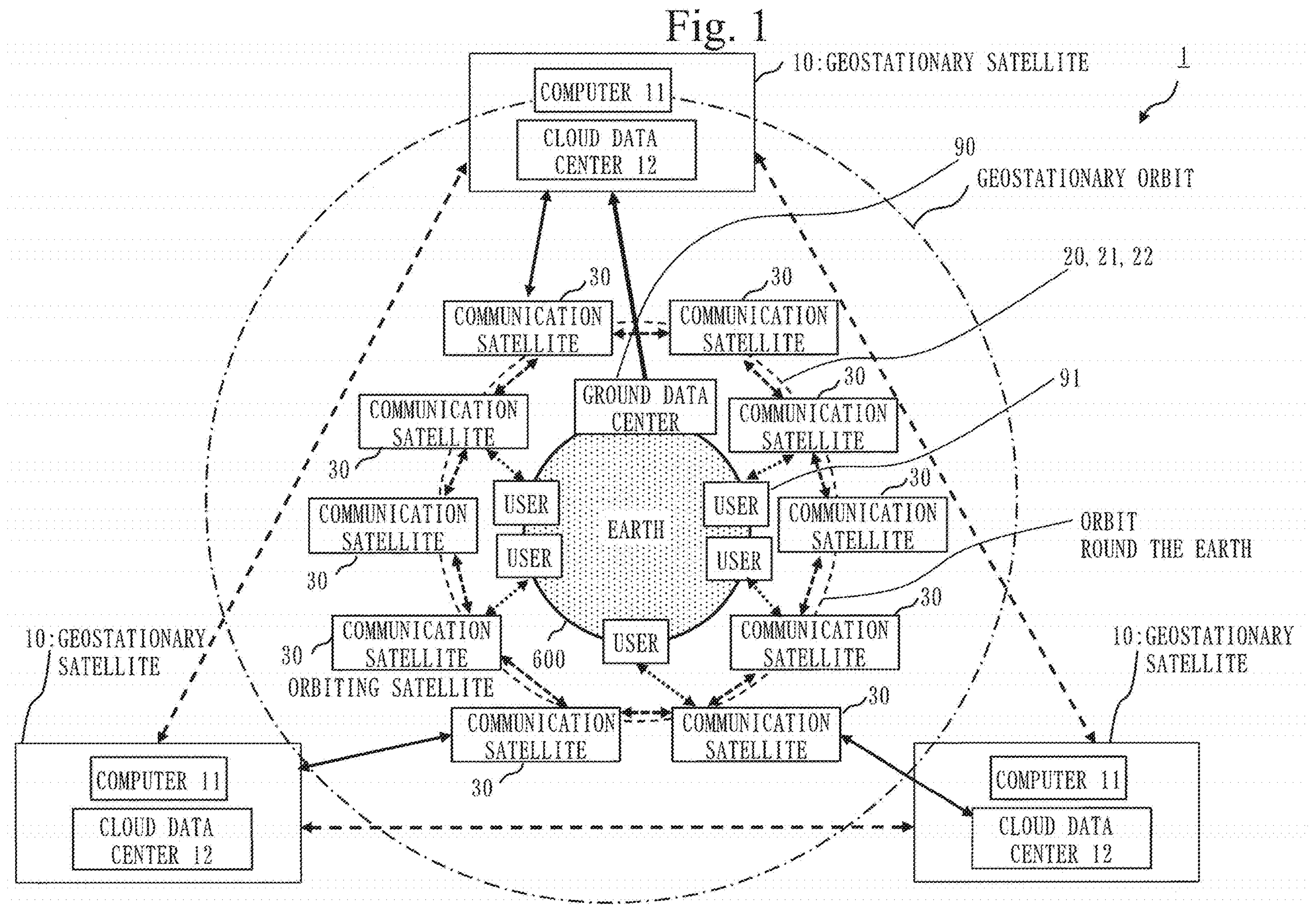
FIG. 1 is a diagram of Embodiment 1, showing a configuration of a cloud computing system 1.

In the description of an embodiment and drawings, the same and corresponding elements are given the same reference characters. Description of elements with the same reference characters will be omitted or simplified as appropriate. In the following embodiment, a “unit” may be read as “circuit”, “step”, “procedure”, “process”, or “circuitry” as appropriate.

Embodiment 1

Referring to FIGS. 1 to 14, a cloud computing system 1 and an edge computing system 2 in Embodiment 1 will be described.

<Cloud Computing>

Along with an increasing amount of information associated with development of an information society, increased power consumption and measures against exhaust heat have become issues. In a centralized mechanism in particular, power intensiveness and measures against exhaust heat of supercomputers and large-scale data centers have been significant problems.

In outer space, on the other hand, heat can be discharged into deep space by radiation cooling. Thus, it is possible to locate a supercomputer or a data center for realizing a cloud environment on the satellite constellation side and to transmit only necessary data to ground users after performing arithmetic processing on orbits. This has the effect of maintaining the cloud environment and reducing green house gas emission, thus contributing to SDGs on the ground.

According to the hybrid constellation consisting of an annular communication network 21 and a mesh communication network 22 discussed below, ground users and the hybrid constellation can send and receive information by way of the annular communication network or the mesh communication network. Also, distributed computing where the satellites constituting the hybrid constellation are considered as IoTs (Internet of Things) has the effect of being able to achieve unified data management with low latency.

Here, a hybrid constellation refers to a constellation that carries out multiple missions including missions other than communication, such as observation and positioning, as well as communication missions. And the hybrid constellation is formed in cases where the communication satellites forming a communication network also carry mission devices other than for communication, such as for observation or positioning, or where satellites other than communication satellite, such as observation satellites and positioning satellites, also carry communication devices responsible for part of a communication network.

Some functions of cloud data centers, which have been conventionally installed on the ground, are incorporated into a geostationary satellite as a space data center. Then, by executing certain processing on the orbits and transmitting only the result of the processing to the ground, an effect of contributing to reduction in the load of ground processing is provided. For example, it is rational to aggregate orbit information for the individual communication satellites constituting a communication satellite constellation into the space data center and to search for the shortest route when information is transmitted by way of the annular communication network or the mesh communication network formed by the communication satellite constellation.

It is also rational to share orbit information in order to avoid an in-system collision accident in the communication satellite constellation, which also makes it possible to send an operation command to a propulsion device on the communication satellite of interest to avoid a collision if a risk of collision is foreseen from a collision analysis at the space data center. In the conventional techniques, such collected orbit information is transmitted from satellites to the ground and then it is analyzed and evaluated on the ground to be transmitted to the satellites. Thus, by autonomously handling such processing in outer space, the amount of data would be decreased, reducing the load of ground processing.

<Edge Computing>

As way of achieving a distributed architecture, edge computing with edge servers arranged on the IoT side has been of increasing interest.

In conventional IoT, a centralized mechanism where data collected by sensors is transmitted to a cloud over the Internet and subjected to analysis has been common. By contrast, edge computing employs an approach of performing data processing in a distributed manner among edge servers installed on devices themselves or among edge servers between the devices and a cloud, thereby achieving real-time and low-load data processing.

Also, along with an increasing amount of information associated with development of an information society, increased power consumption and measures against exhaust heat have become issues. In a centralized mechanism in particular, power intensiveness and measures against exhaust heat of supercomputers and large-scale data centers have been significant problems.

On the other hand, in outer space, heat can be discharged into deep space by radiation cooling. So, it is rational to locate edge servers on the satellite constellation side considering satellites as devices in IoT and to transmit only necessary data to the ground after distributed computing processing on the orbits. A hybrid constellation has the effect of achieving low latency and unified data management by sending and receiving information to/from a cloud that is equipped with a data center at a ground facility 700 by way of an annular communication network or a mesh communication network.

Purposes for processing by distributed computing include (1), (2), (3), and (4) below:

(1) The purpose of reducing the load of ground processing by processing items that have been conventionally processed by cloud computing on the ground through on-orbit distributed computing;

(2) The purpose of reducing the amount of data to be transmitted to the ground by processing satellite information acquired by mission satellites by distributed computing on the orbits;

(3) The purpose of performing autonomous system management on the orbits, like in-system collision prevention in a satellite constellation; and (4) The purpose of eliminating transmission and reception of information to/from a ground system to allow faster determination, by quick processing of information acquired on the orbits at an emergency and by distributed computing of information that should be reflected in the next step on the orbits through autonomous determination, like in a flying object tracking system.

Effects of distributed computing performed on the orbits by satellites analogous to IoT devices include (1), (2), (3), and (4) below:

(1) Solution of exhaust heat issues caused by increase and concentration of power consumption at a ground facility;

(2) Reduced ground processing load due to decrease in the amount of data on satellite information to be transmitted to the ground;

(3) Reduced ground processing load due to autonomous system management by a satellite constellation; and (4) Quicker handling upon an emergency.

The effect of reducing ground processing load in (2) and (3) in turn provides the effect of decreasing green house gas emission to contribute to SDGs on the ground. As to division of roles between a geostationary satellite and an orbiting satellite, the respective features of the satellites, that is, a geostationary satellite having the ability to communicate with ground facilities at all times and an orbiting satellite having the ability to transmit information with low latency to users located across the globe, are exploited.

Information on the latest position of a moving object deployed on the ground, for example, for which sending and reception of information to/from a ground data center is required, is stored in a space data center provided on a geostationary satellite. It is rational that the geostationary satellite transmits the information to an orbiting satellite and then the orbiting satellite side performs edge computing and transmits only necessary information to users.

Specifically, in a case of a flying object coping system, for example, a process from path prediction for a flying object to landing prediction is done by edge computing on the orbits.

During this, it is necessary to transmit a predicted time of landing and position coordinates to a flying object coping asset deployed in the earth region in which the landing is expected. If the coping asset is a moving object, it is necessary to ascertain its latest deployment information in advance. Accordingly, for deployment information of coping assets, updated information is stored in the space data center on the geostationary satellite from ground facilities as appropriate.

When an orbiting satellite detected the launch of a flying object, it is rational that the geostationary satellite immediately transmits information stored in the geostationary satellite to orbiting satellites and an orbiting satellite that is scheduled to pass in the vicinity of the expected region of landing transmits flying object information to a coping asset.

Optical communication has the effect of allowing information to be transmitted quickly over a long distance, because it allows expansion of data communication capacity.

Specific examples are described below.

<Configuration of Cloud Computing System 1>

Referring to FIGS. 1 to 5, the cloud computing system 1 is described.

FIG. 1 shows a system configuration of the cloud computing system 1.

The cloud computing system 1 includes geostationary satellites 10 each having a computer 11 and a cloud data center 12 mounted thereon, a low earth orbiting satellite constellation 20 including multiple satellites, and a ground data center 90 deployed on the ground. The multiple satellites included in the low earth orbiting satellite constellation 20 are orbiting satellites orbiting the earth and are communication satellites. The satellites included in the low earth orbiting satellite constellation 20 are hereinafter represented as communication satellites 30. As shown in FIG. 1, in the cloud computing system 1, user terminals 91 on the earth 600 are capable of communicating with the communication satellites 30 of the low earth orbiting satellite constellation 20.

<Communication Satellite 30>

Figure 2:
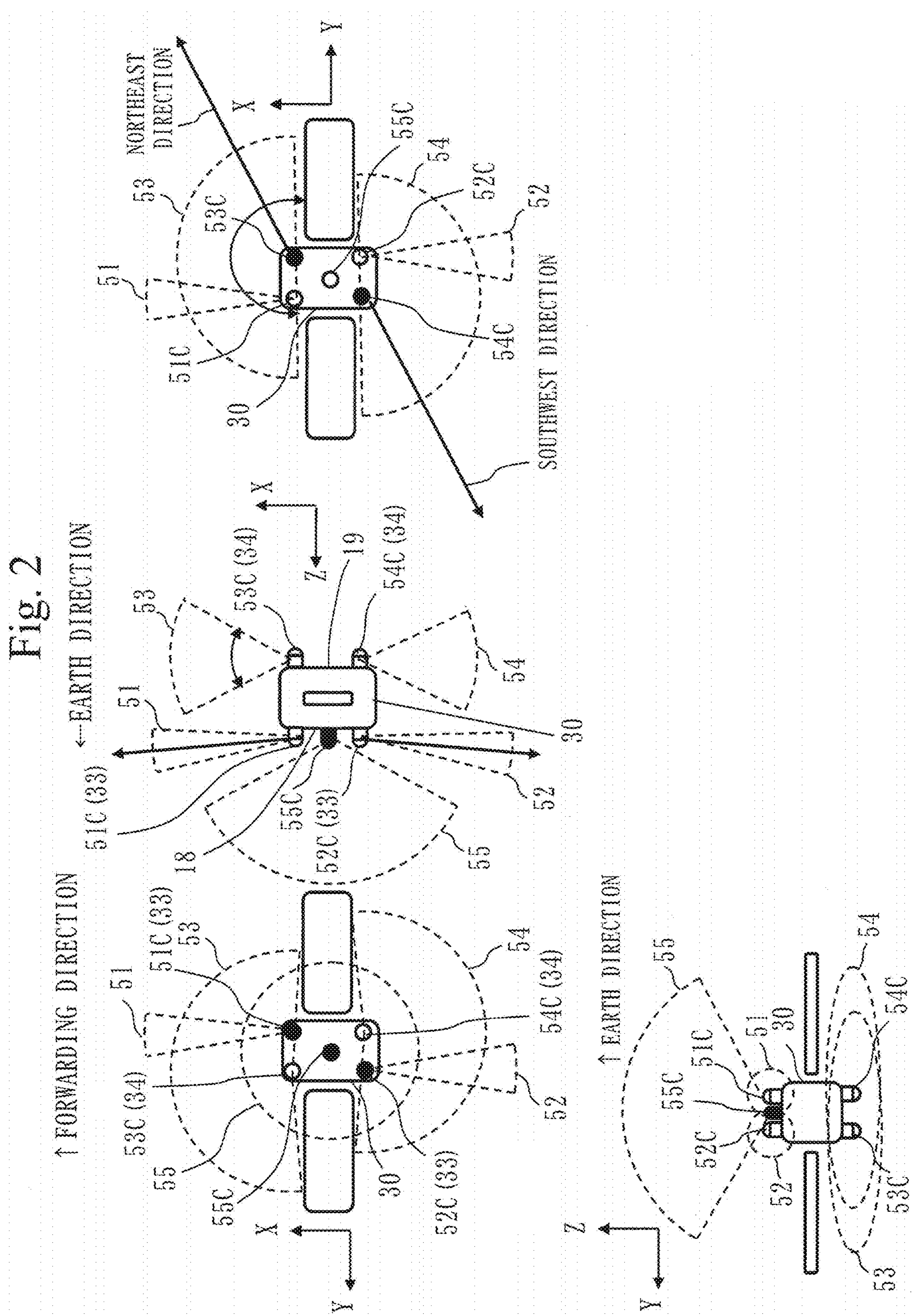
FIG. 2 is a diagram of Embodiment 1, being four orthogonal views of a communication satellite 30 of the cloud computing system 1.

FIG. 2 is four orthogonal views of a communication satellite 30. In the XYZ coordinates shown in FIG. 2, the X axis direction indicates a forwarding direction of the communication satellite 30 and the Z axis direction indicates an earth direction. A black circle indicates a communication device that is visible and a white circle indicates a communication device that is not visible for the sake of convenience.

The communication satellite 30 includes a first communication device 51C, a second communication device 52C, a third communication device 53C, a fourth communication device 54C, and a ground communication device 55C. As shown on the XZ plane, on an earth-oriented plane 18 facing the earth 600, the first communication device 51C, the second communication device 52C, and the ground communication device 55C are arranged. The first communication device 51C and the second communication device 52C implement a fore-aft communication device 33. The first communication device 51C performs communication with the second communication device 52C of the communication satellite 30 flying in front of the communication satellite 30, and the second communication device 52C performs communication with the first communication device 51C of the communication satellite 30 flying behind the communication satellite 30. On a counter-earth-oriented plane 19, which is the back plane of the earth-oriented plane 18, the third communication device 53C and the fourth communication device 54C are arranged. The third communication device 53C and the fourth communication device 54C implement a right-left communication device 34. As discussed later, the third communication device 53C performs communication with the fourth communication device 54C of the communication satellite 30 flying in the adjacent orbit on the right side (the east side), and the fourth communication device 54C performs communication with the third communication device 53C of the communication satellite 30 flying in the adjacent orbit on the left side (the west side).

The first communication device 51C is arranged forward in the forwarding direction of the communication satellite 30. The first communication device 51C has a communication visual field 51 in the forwarding direction of the communication satellite 30. The second communication device 52C is arranged rearward of the first communication device 51C with respect to the forwarding direction of the communication satellite 30. The second communication device 52C has a communication visual field 52 in the opposite direction to the forwarding direction of the communication satellite 30.

The third communication device 53C and the fourth communication device 54C are arranged on the counter-earth-oriented plane 19, which is the back plane of the earth-oriented plane 18 and is oriented in the opposite direction of a geocentric direction +Z. The third communication device 53C is arranged forward in the forwarding direction. The third communication device 53C has a communication visual field 53 forward in the forwarding direction. The third communication device 53C forms cross-link communication in a northeast communication direction with the communication satellite 30 flying in the orbit adjacent on the east side, or the right side. The fourth communication device 54C is arranged rearward of the third communication device 53C with respect to the forwarding direction. The fourth communication device 54C has a communication visual field 54 in the opposite direction to the forwarding direction. The fourth communication device 54C forms cross-link communication in a southwest communication direction with the communication satellite 30 flying in the orbit adjacent on the west side, or the left side.

<Ground Communication Device 55C>

The communication satellite 30 on the orbital plane may include the ground communication device 55C for communication with the ground data center 90. In an inclined circular orbit with an orbital inclination of 40 degrees or more to 60 degrees or less, the flying direction in the north-south direction reverses at the southern and northern edges of the orbital plane, which results in a situation where the communication satellite 30 is temporarily flying from west to east. In this case, a satellite congested zone where satellites fly from west to east is formed above an area on the ground surface within the range of a latitude of 40 degrees or more to 60 degrees or less. Accordingly, a ground facility located in the range of a northern latitude of 40 degrees or more to 60 degrees or less or in the range of a southern latitude of 40 degrees or more to 60 degrees or less can frequently form cross-link communication with the satellite constellation.

<Annular Communication Network 21>

Figure 3:
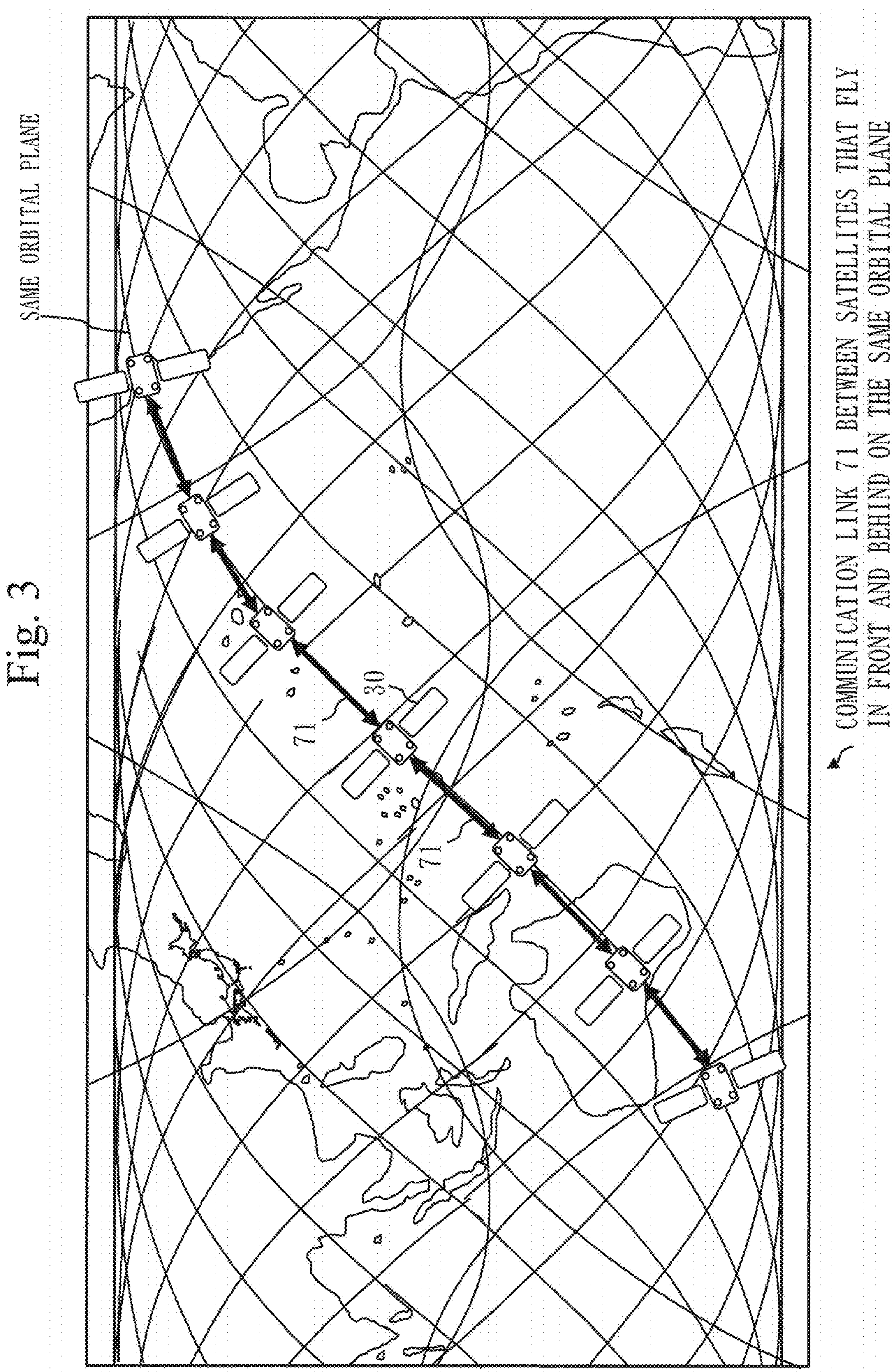
FIG. 3 is a diagram of Embodiment 1, showing an example where the communication satellite 30 of the cloud computing system 1 communicates with front and rear communication satellites that fly in front of and behind it on the same orbital plane.

FIG. 3 shows an example where a flying communication satellite 30 performs communication with satellites that fly in front of and behind it on the same orbital plane. As shown in FIG. 3, the fore-aft communication device 33 performs communication with the communication satellites 30 flying in front of and behind it on the same orbital plane.

Specifically, the fore-aft communication device 33 of the communication satellite 30 forms a bi-directional communication link 71 with the fore-aft communication devices 33 provided on the communication satellites 30 flying in front of and behind it on the same orbital plane. The formation of the communication link 71 enables the satellites flying in front and behind on the same orbital plane to communicate with each other bi-directionally. In the low earth orbiting satellite constellation 20, six or more communication satellites 30 flying on the same orbital plane each form the communication link 71 with the front and rear communication satellites 30, such that the annular communication network 21 can be formed over and around the earth 600.

Figure 4:
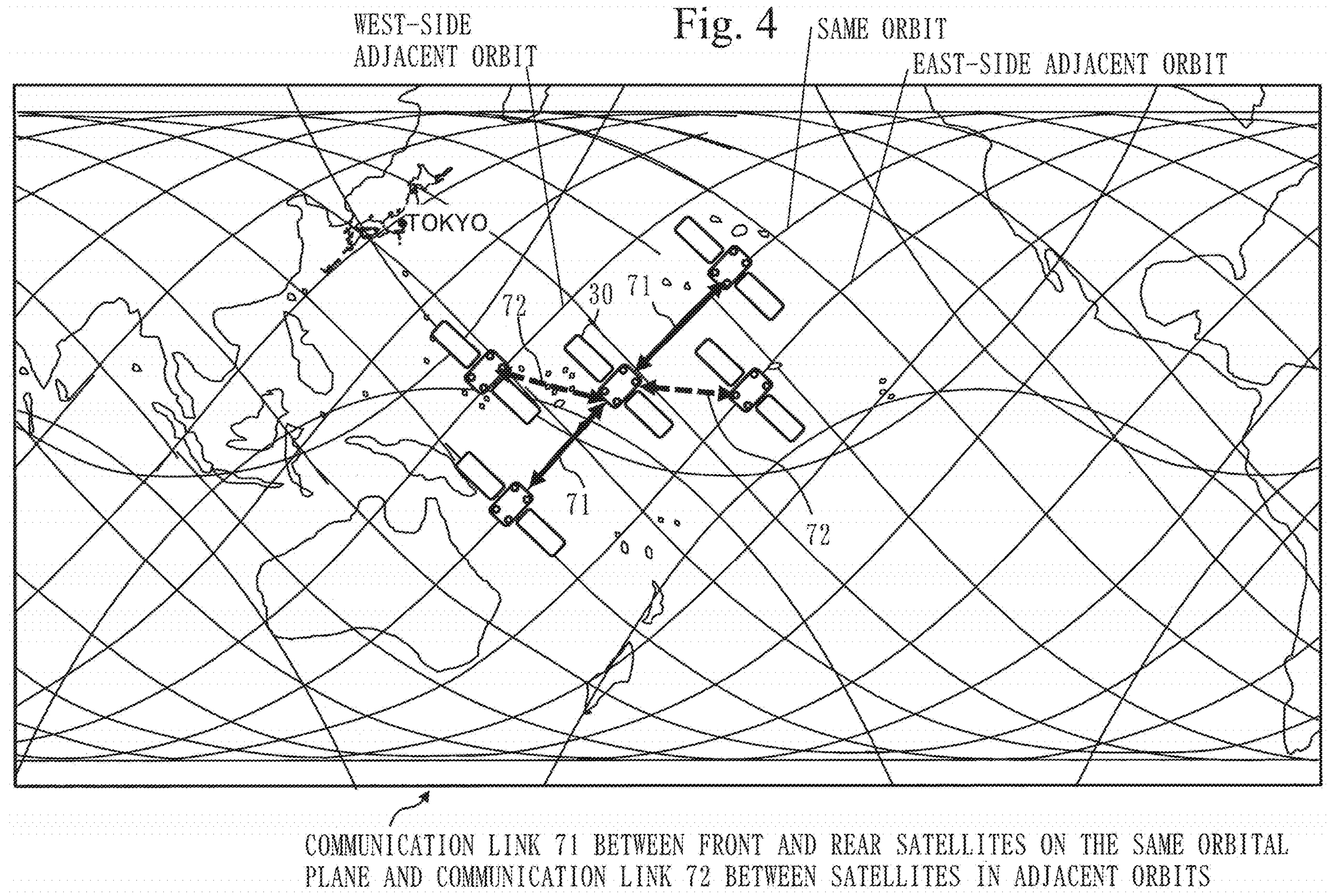
FIG. 4 is a diagram of Embodiment 1, showing an example where the communication satellite 30 of the cloud computing system 1 communicates with satellites that fly in right and left (east and west) adjacent orbits.

FIG. 4 is a diagram showing an example where the communication satellite 30 communicates with satellites that fly in right and left (east and west) adjacent orbits. As shown in FIG. 4, the right-left communication device 34 performs communication with the communication satellites 30 flying in the adjacent orbits. Specifically, the right-left communication device 34 of the communication satellite 30 forms bi-directional communication links 72 with the right-left communication devices 34 provided on the communication satellites 30 flying in the adjacent orbits. In FIG. 4, the right-left communication device 34 provided on the communication satellite 30 forms the bi-directional communication links 72 with the right-left communication devices 34 of the communication satellites 30 flying in the adjacent orbits on the east side and the west side, respectively. The formation of the communication links 72 enables bi-directional communication with the satellites flying in the adjacent orbits.

Figure 5:
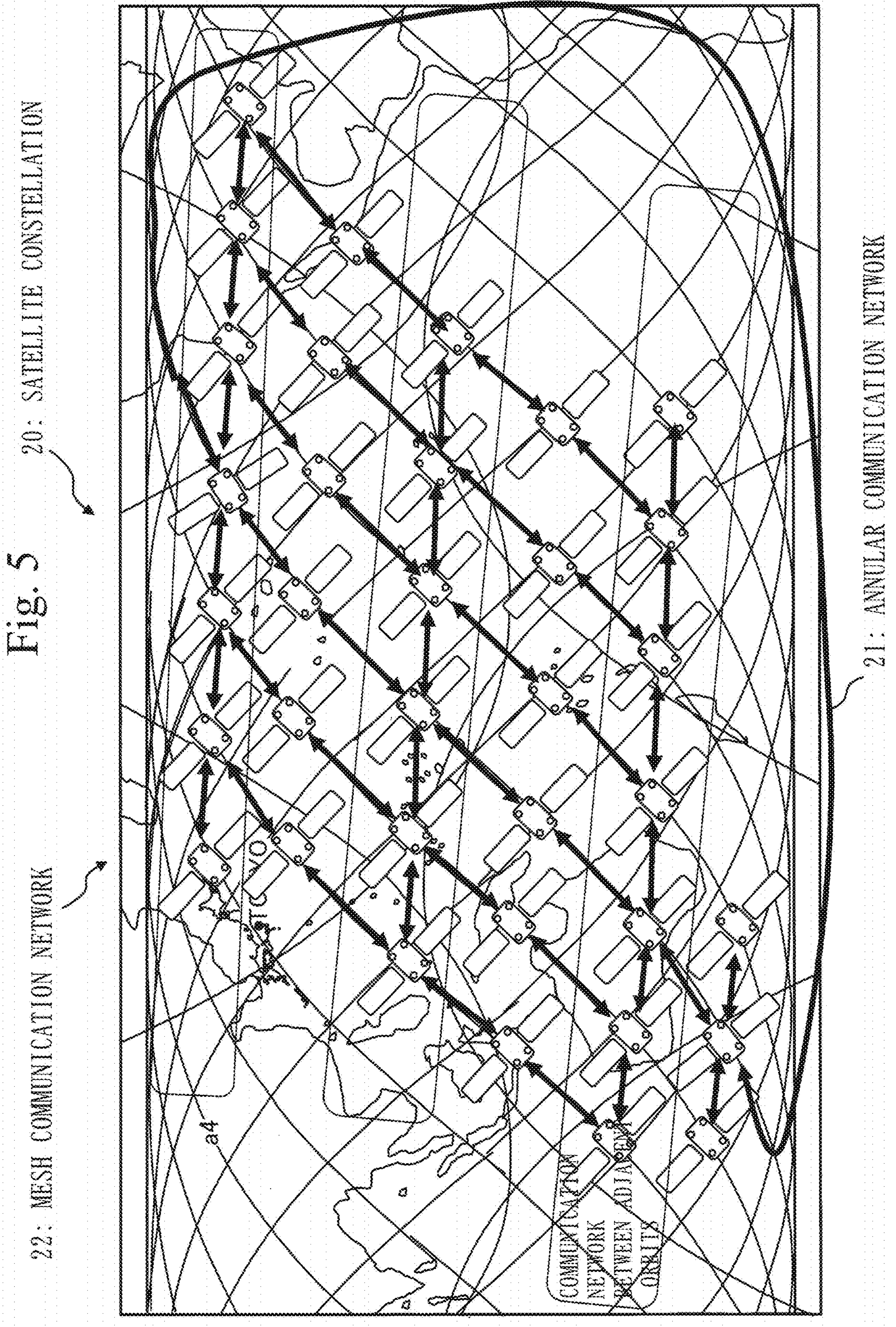
FIG. 5 is a diagram of Embodiment 1, illustrating a mesh communication network 22 of the cloud computing system 1.

FIG. 5 shows the mesh communication network 22. In the low earth orbiting satellite constellation 20, the mesh communication network 22 shown in FIG. 5 is formed by connection of the annular communication networks 21 each on the same orbital plane described in FIG. 3 by the communication links 72 described in FIG. 4.

<Annular Communication Network 21 and Mesh Communication Network 22>

In the low earth orbiting satellite constellation 20 shown in FIG. 1, each communication satellite 30 of the multiple communication satellites 30 flying on the same orbital plane is equipped with the first communication device 51C and the second communication device 52C, which are the fore-aft communication device 33 for communicating with the front and rear communication satellites 30 in the forwarding direction, as shown in FIG. 2. By equipping the communication satellites 30 with the fore-aft communication devices 33, the annular communication network 21 is formed in the low earth orbiting satellite constellation 20 as shown in FIG. 5.

Also, as shown in FIG. 2, in the low earth orbiting satellite constellation 20, each communication satellite 30 of the multiple communication satellites 30 flying on the same orbital plane is equipped with the third communication device 53C and the fourth communication device 54C, which are the right-left communication device 34 for communicating with both the communication satellite 30 as a left-side communication satellite flying in the left adjacent orbit and the communication satellite 30 as a right-side communication satellite flying in the right adjacent orbit. By equipping the communication satellites 30 with the right-left communication devices 34, the mesh communication network 22, in which adjacent annular communication networks 21 are communicably connected with each other, is formed in the low earth orbiting satellite constellation 20 as shown in FIG. 5. Since the mesh communication network 22 is structured by connection of the annular communication networks 21, when reference is made to "communication via the mesh communication network 22", it encompasses the annular communication networks 21 as well. The low earth orbiting satellite constellation 20 is a communication satellite constellation.

<Description of Cloud Computing System 1>

With the advent of the IoT era where all sorts of things and events are connected to the Internet, centralized cloud computing which conducts centralized processing with aggregated servers has increasing power consumption and measures against exhaust heat have become an issue along with dramatical increase in the amount of data and faster processing speed. A supercomputer or computers that make up a large-scale data center have high power consumption and also generate much heat. Thus, they have been operated in a ground facility equipped with a large-scale cooling facility; however, it has an issue in that consumption of large electricity or exhaust heat to the outside is disadvantageous in terms of SDGs.

While deployment of data centers in cold areas has been considered as a solution to this issue, the cloud computing system 1 shown in FIG. 1 can provide a similar cooling effect to deployment in a cold area by deploying data centers and computers in outer space.

In outer space, heat can be discharged into deep space by radiation cooling. Electric power necessary for the computers and data centers can be generated with solar cells and radiator panels for heat dissipation can be expanded to increase the amount of discharged heat.

Additionally, as cloud computing is becoming more popular, locations where a supercomputer or a data center is installed are no longer a constraint for users. As long as fast communication lines are ensured, issues on the ground can be solved by deploying computers and data centers, which have high power consumption and generate much heat, in outer space.

On the other hand, when an optical fiber communication network or the like is to be laid on the ground, routing a high capacity communication network from a high latitude region to a metropolitan area where users are concentrated has the issue of being disadvantageous in terms of cost.

As opposed to this, a hybrid constellation which is formed at an orbit altitude of about 350 km, for example, and forms an annular communication network and mesh communication network of optical communication terminals has the effect of facilitating provision of an information communication network from a high latitude region to a metropolitan area and also being preferable in terms of latency. Since a polar orbit satellite passes over a polar region in every revolution, it has the effect of facilitating expansion of communication capacity for a high latitude region, including a polar region.

In an inclined orbit satellite as well, the forwarding direction of a satellite that moves up northward from the south hemisphere changes at the northern extremity of the orbital plane to a direction in which the satellite flies from west to east and moves down southward from the north hemisphere, and the forwarding direction of a satellite that moves down southward from the north hemisphere changes at the southern extremity of the orbital plane to a direction in which the satellite flies from west to east and moves up northward from the south hemisphere. So, an orbit with an orbital inclination of 50 degrees or more has the effect of facilitating expansion of the capacity of communication with a ground facility installed in a high latitude region, including the polar region, at the northern extremity and the southern extremity of the orbital plane in a region where the satellite flies from west to east.

Since a geostationary satellite orbits over the equator in synchronization with the rotation of the earth, it can communicate with a ground data center at all times. Thus, by shifting a portion of data processing that cannot be handled by the ground data center to a space data center on a geostationary orbit and receiving only required calculation results on the ground, it has the effect of reducing power consumption of ground processing and decreasing green house gas to be discharged.

In this way, outside air or snow is utilized to cool heat-generating devices to save power and in turn to reduce green house gas. Distribution of a large-scale data center can also facilitate risk diversification in case of a large-scale disaster.

By replacing communication lines that have conventionally transmitted information to users by means of land communication lines with a communication network of low earth orbiting satellites, shortage of communication lines associated with the increasing amount of data can be compensated for and information distribution with low latency can be realized across the globe, including remote areas where laying of communication lines is not completed yet.

<Artificial Intelligence>

In FIG. 1, the computer 11 mounted on the geostationary satellite 10 is equipped with artificial intelligence. Computer processing related to earth environment or meteorology that reflects information acquired by satellites and that has conventionally been done in large-scale computation at a ground facility is performed at the computers 11 in outer space and only necessary information is transmitted to ground users, such that the load of ground processing can be reduced.

In a case of operating an earth environment or climate simulator, for example, if communication is possible with all the communication satellites 30 by way of the mesh communication network 22, it is possible to acquire monitoring information related to the earth environment or climate, such as clouds, vegetation, or green house gas, via surveillance satellites equipped with monitoring devices. This permits real-time update of simulator information and the load of ground processing can be reduced by transmitting only simulation results to ground users.

It is also possible to improve the identification probability for a monitoring target or to speed up identification when the computers 11 mounted on the geostationary satellites 10 perform machine learning of artificial intelligence AI by using preliminary information pre-stored in edge servers or data centers as teacher data.

For example, in ship identification with a synthetic aperture radar, a ship model that captures features, such as outline dimensions and bridge positioning, can be stored in advance as preliminary information and the artificial intelligence of the computers 11 use it as teacher data to perform machine learning. This enables a model type to be quickly and accurately identified in automated identification processing of an image acquired by the synthetic aperture radar.

There is also an effect of improvement in the probability of correct identification by accumulating monitoring information for the same moving object acquired in the past in edge servers or data centers and deep learning by the artificial intelligence of the computer 11 using it as teacher data in AI machine learning.

<Edge Computing System 2>

Referring to FIGS. 6 to 11, the edge computing system 2 is described.

Figure 6:
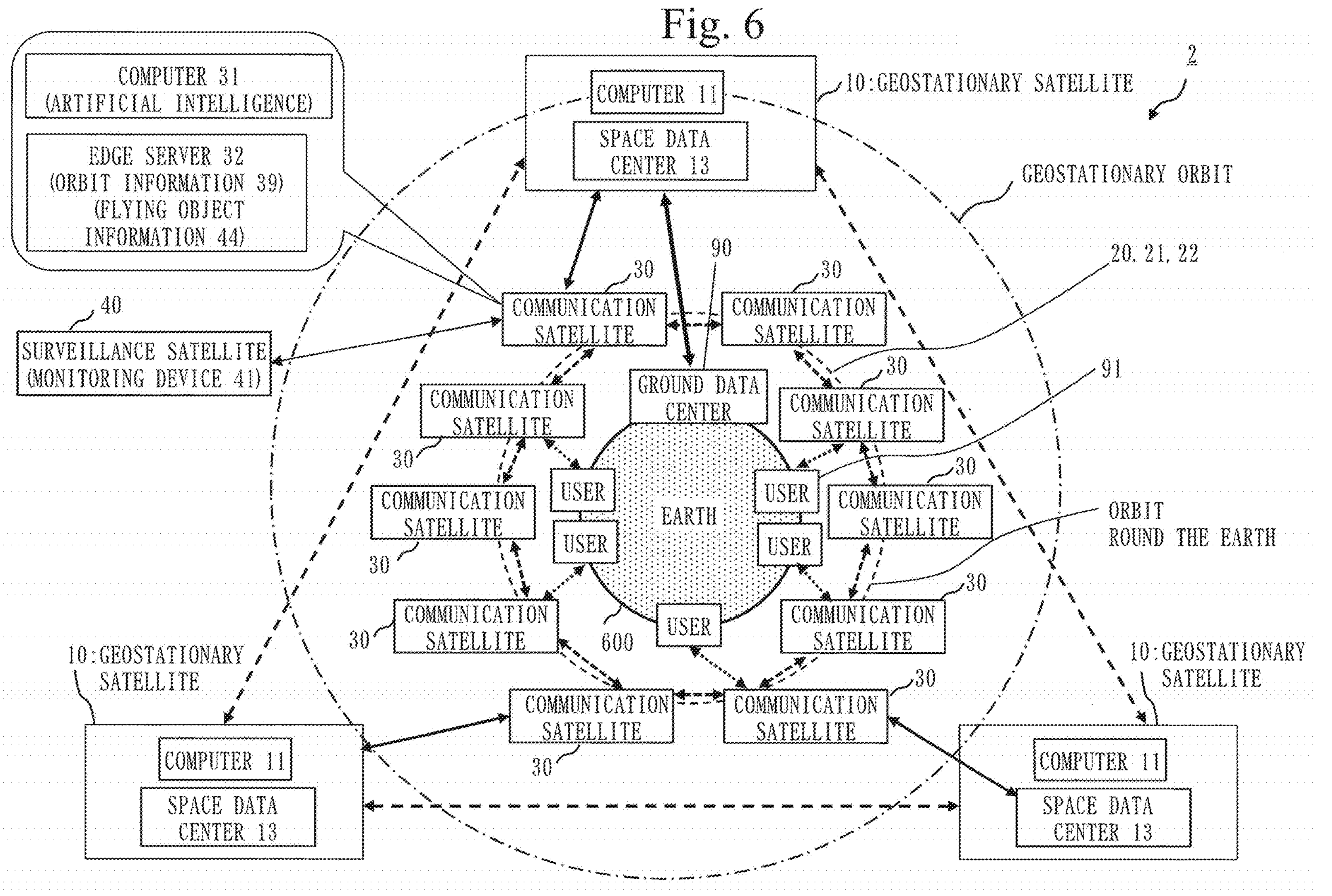
FIG. 6 is a diagram of Embodiment 1, showing a system configuration of an edge computing system 2.

FIG. 6 shows a system configuration of the edge computing system 2. The edge computing system 2 includes: geostationary satellites 10 each having a computer 11 and a space data center 13 mounted thereon; a low earth orbiting satellite constellation 20 having multiple communication satellites 30 and including a communication satellite 30 with a computer 31 and an edge server 32 mounted thereon among the multiple communication satellites 30; and a ground data center 90 deployed on the ground. In the edge computing system 2, the low earth orbiting satellite constellation 20 forms the annular communication network 21 and the mesh communication network 22, as in the cloud computing system 1. As shown in FIG. 6, in the edge computing system 2, the user terminals 91 on the earth 600 are capable of communicating with the communication satellites 30 of the low earth orbiting satellite constellation 20, as in the cloud computing system 1.

Along with the advent of the IoT era where all sorts of things and events are connected to the Internet and circulation of an enormous amount of data, attention has been paid not only to data aggregation and processing by conventional cloud computing but to "edge computing", which processes data on the edge side of an area close to users. Cloud computing, such as the one shown in FIG. 1, is centralized processing type, which conducts centralized processing with aggregated servers. By contrast, edge computing is distributed processing type, which processes information at terminal devices in a network or conducts processing with servers distributed across a network. In the edge computing system 2 of FIG. 6, the communication satellite 30 has the computer 31 and the edge server 32 mounted thereon.

<Artificial Intelligence>

In the edge computing system 2, at least the computer 31 mounted on the communication satellite 30 is equipped with artificial intelligence. The computers 11 may also be equipped with artificial intelligence.

In a flying object tracking system, for example, it is necessary that a satellite sends information on a flying object whose launch was detected to a following satellite, and following satellites repeat monitoring to accumulate tracking information for the flying object so that the flying path of the flying object is predicted.

When orbiting satellites are individually equipped with the edge server 32 and the computer 31 with artificial intelligence and the computers 31 of the communication satellites 30 conduct parallel processing, there is an effect of being able to handle an emergency more quickly than when a centralized computer equipped with artificial intelligence processes a series of processes collectively and transmits the result to the orbiting satellites (the communication satellites 30) after each execution of processing.

By sharing a processing algorithm, the results of analysis will be the same if the individual satellites perform analysis processing concurrently.

<Collision Avoidance>

Reference is made to FIG. 6. In the edge computing system 2, the edge server 32 stores orbit information 39 for the multiple communication satellites 30 included in the low earth orbiting satellite constellation 20. The computer 31 mounted on the same communication satellite 30 with this edge server 32 analyzes a risk of collision between orbiting satellites of the multiple communication satellites 30 included in the low earth orbiting satellite constellation 20, from the orbit information 39 stored in the edge server 32 using artificial intelligence.

In the low earth orbiting satellite constellation 20, in which the communication satellites 30 fly at the same altitude on multiple orbital planes of different normal vectors, there is a risk of collision between communication satellites 30 on a line of intersection of orbital planes. As such, among the satellites that constitute the edge computing system 2, the communication satellites 30, each equipped with the edge server 32 which possesses the orbit information 39 for the satellites and the computer 31 which performs risk analysis using the orbit information 39, are deployed. If there is any communication satellite 30 for which a collision is foreseen by a computer 31, collision can be avoided and flight safety can be ensured by giving an instruction to the communication satellite 30 to operate its propulsion device, discussed later, on the orbit from a ground facility such as the ground data center 90.

<Transmission of Flying Object Information>

As shown in FIG. 6, the low earth orbiting satellite constellation 20 is capable of communicating with a surveillance satellite 40, which has a monitoring device 41 for acquiring flying object information 44 mounted thereon, via the mesh communication network 22.

The edge server 32 stores the orbit information 39 for the multiple communication satellites 30 included in the low earth orbiting satellite constellation 20, and also has received and stored the flying object information 44 acquired by the monitoring device 41 of the surveillance satellite 40 from the surveillance satellite 40.

The computer 31 mounted on the same communication satellite 30 with the edge server 32 sends the flying object information 44 stored in the edge server 32 to the other communication satellite 30 included in the low earth orbiting satellite constellation 20 by referencing the orbit information 39, and transmits the flying object information 44 to the other surveillance satellites via the low earth orbiting satellite constellation 20.

The surveillance satellite 40 equipped with the monitoring device 41 as a mission satellite acquires launch detection information for a flying object as initial flying object information and sends it to the communication satellites 30 which are equipped with the edge server 32. The computer 31 mounted on the same communication satellite 30 with this edge server 32 selects a surveillance satellite that can track and monitor the flying object by using artificial intelligence, and sends the flying object information to the selected surveillance satellite. This enables flying object tracking. In this case, the orbit information 39 includes the orbit of the surveillance satellite 40 as well.

The communication satellite 30 may include the monitoring device 41 as a surveillance satellite 40.

<Flying Path Prediction>

FIG. 7 is a diagram showing a state where the low earth orbiting satellite constellation 20 is capable of communicating with surveillance satellites 40. A description will be given with reference to FIG. 7. The low earth orbiting satellite constellation 20 is capable of communicating with multiple surveillance satellites 40-1, 40-2 each having the monitoring device 41 for acquiring flying object information 44 mounted thereon. The edge server 32 acquires and stores the flying object information 44 from the multiple surveillance satellites 40-1, 40-2, and also stores preliminary information 45 as flying object attribute information. The computer 31 mounted on the same communication satellite 30 with the edge server 32 calculates a predicted flying path of the flying object by executing flying path analysis with artificial intelligence, using the flying object information 44 and the preliminary information 45 stored in the edge server 32. Then, the computer 31 sends the flying object information 44 stored in the edge server 32 to a surveillance satellite 40-3 that can track the predicted flying path via a communication satellite 30-1 and a communication satellite 30-2 belonging to the low earth orbiting satellite constellation 20.

As the preliminary information 45, the edge server 32 stores a flying object model including flying object type, propellant type, a possible flight distance, and a typical flight profile. The edge server 32 acquires flying object information 44, which is tracking information for the flying object acquired by the surveillance satellites 40-1, 40-2 equipped with monitoring devices 41 as mission satellites, from these multiple surveillance satellites 40-1, 40-2. The computer 31 mounted on the same communication satellite 30 with this edge server 32 performs predictive analysis of the flying path through inference by AI machine learning of artificial intelligence by referencing the preliminary information 45, which is a flying object model. The computer 31 sends the flying object information 44 to the surveillance satellite 40-3 which can track the predicted flying path, thus enabling flying object tracking.

The communication satellite 30 may include the monitoring device 41 as a surveillance satellite 40.

<Landing Prediction>

A description will be given with reference to FIG. 7. The low earth orbiting satellite constellation 20 is capable of communicating with multiple surveillance satellites 40-1, 40-2 each having the monitoring device 41 for acquiring flying object information 44 mounted thereon. The edge server 32 acquires and stores the flying object information 44 from the multiple surveillance satellites 40-1, 40-2, and also stores preliminary information 45 as flying object attribute information. The computer 31 mounted on the same communication satellite 30 with the edge server 32 executes prediction of flying object landing with artificial intelligence, using the flying object information 44 and the preliminary information 45 stored in the edge server 32. Then, this computer 31 selects a communication satellite 30-3, 30-4 that can send the flying object information 44 to a coping asset 92 capable of coping from the multiple communication satellites 30 included in the low earth orbiting satellite constellation 20 by referencing the result of prediction of flying object landing. The computer 31 makes the selected communication satellite 30-3, 30-4 transmit the flying object information 44 to the coping asset 92 capable of coping. The edge server 32 stores information on the location where the flying object coping asset 92 is deployed as preliminary information 45. The computer 31 estimates the landing location by AI machine learning and sends the flying object information 44 to a coping asset 92 located near the predicted landing location. This enables flying object coping.

The communication satellite 30 may include the monitoring device 41 as a surveillance satellite 40.

<Synthetic Aperture Processing>

Figure 8:
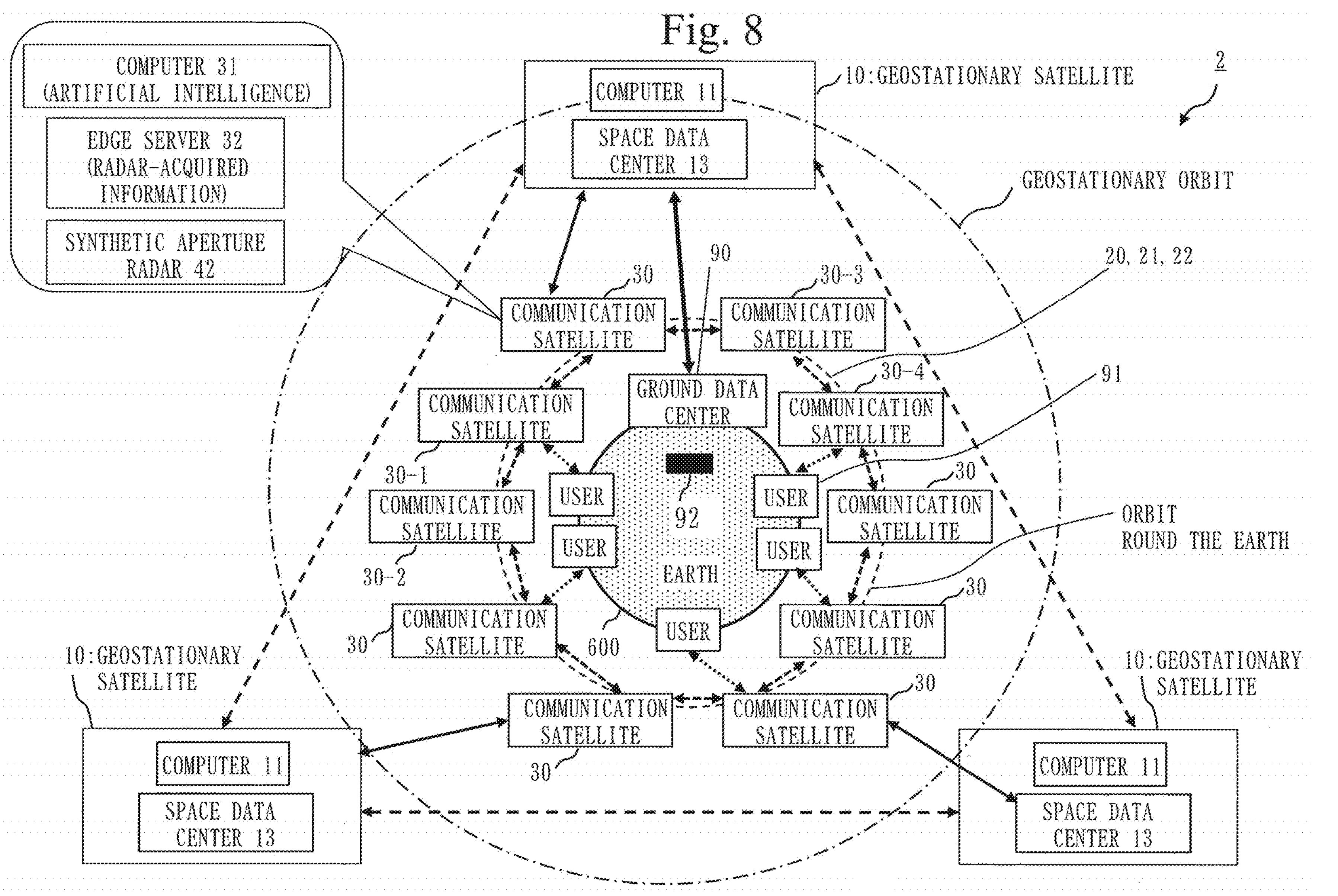
FIG. 8 is a diagram of Embodiment 1, showing an edge computing system 2 in which one or more communication satellites 30 belonging to the low earth orbiting satellite constellation 20 are equipped with a synthetic aperture radar 42.

FIG. 8 shows the edge computing system 2 in which one or more communication satellites 30 belonging to the low earth orbiting satellite constellation 20 are equipped with a synthetic aperture radar 42. A description will be given with reference to FIG. 8. One or more communication satellites 30 among the communication satellites 30 are equipped with the synthetic aperture radar 42, and store radar-acquired information acquired by the synthetic aperture radar 42 in the edge server 32 mounted together with it. This communication satellite 30 is an observation satellite. The computer 31 mounted on the same communication satellite 30 with the edge server 32 uses the radar-acquired information acquired by the synthetic aperture radar 42 to perform image generation by synthetic aperture processing which processes the radar-acquired information on the orbit, and sends image data generated in the image generation to the ground data center 90 via the geostationary satellite 10.

With conventional observation satellites equipped with a synthetic aperture radar, processing for performing synthetic aperture processing and imaging has been conducted on the ground. In this case, the amount of data sent from the observation satellite to the ground is enormous, so that there has been a demand for a system that performs synthetic aperture processing on the orbit and transmits only image data to the ground. The edge computing system 2 shown in FIG. 8 has the effect of decreasing the amount of data to be transmitted to the ground and the effect of reducing the load of ground processing by performing edge computing on the orbits. It is also possible that multiple mission satellites are equipped with a synthetic aperture radar and multiple mission satellites store observation information acquired from the same observation target in the edge servers for synthetic aperture processing. Further, if the communication satellites 30 that are equipped with the synthetic aperture radar 42, the communication satellites 30 that have the computer 31 mounted thereon, and the communication satellites 30 that have the edge server 32 mounted thereon are separate, the computers 31 still can process radar-acquired information by way of the mesh communication network 22.

<Super-Resolution>

Figure 9:
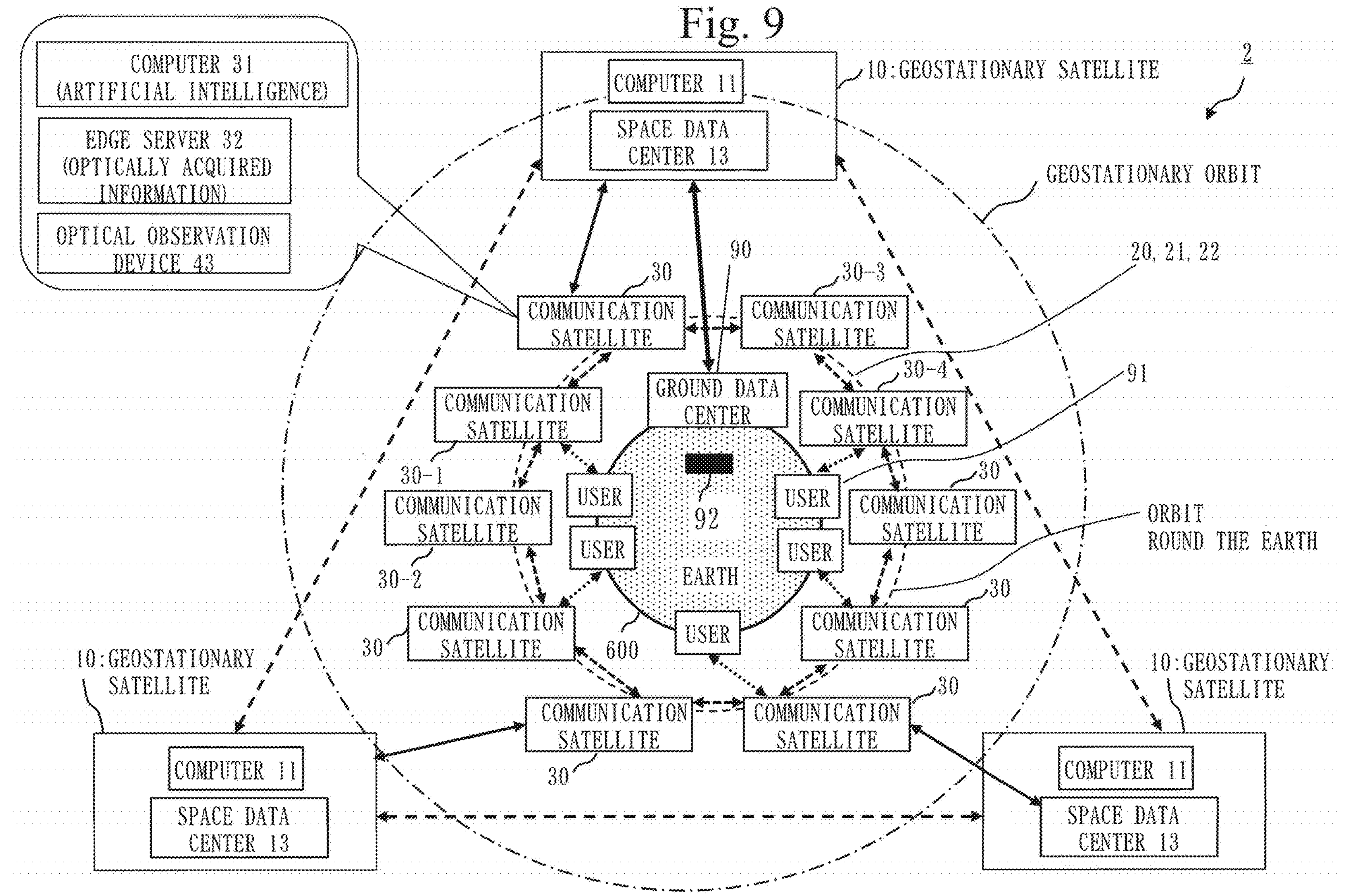
FIG. 9 is a diagram of Embodiment 1, showing a configuration in which the edge computing system 2 includes a satellite equipped with an optical observation device 43.

FIG. 9 shows a configuration in which the edge computing system 2 includes a satellite equipped with an optical observation device 43. At least either of the geostationary satellite 10 and one or more communication satellites 30 of the multiple communication satellites 30 included in the low earth orbiting satellite constellation 20 is equipped with the optical observation device 43. A satellite equipped with the optical observation device 43 stores optically acquired information acquired by the optical observation device 43 in the edge server 32. A satellite equipped with the optical observation device 43 is an observation satellite. FIG. 9 shows an instance where a communication satellite 30 has the optical observation device 43. The computer 31 mounted on the same communication satellite 30 with the edge server 32 uses optically acquired information acquired by the optical observation device 43 to perform image generation by super-resolution processing on the orbit, and sends image data generated in the image generation to the ground data center 90 via the geostationary satellite 10.

In cases where super-resolution processing is applied to images acquired by an observation satellite equipped with an optical observation device, image information is transmitted to the ground and then super-resolution processing is performed in a ground processing facility. In this case, the amount of data sent from the observation satellite to the ground is enormous, so that there has been a demand for a system that performs super-resolution processing on the orbits and transmits only image data to the ground. Performing edge computing on the orbits as shown in FIG. 9 has the effect of decreasing the amount of data to be transmitted to the ground, reducing the load of ground processing. It is also possible that multiple mission satellites are equipped with the optical observation device 43 and multiple mission satellites store monitoring information acquired from the same observation target in the edge servers for super-resolution processing. Also, if the satellites that are equipped with the optical observation device 43, the satellites that have the computer 31 mounted thereon, and the satellites that have the edge server 32 mounted thereon are separate, processing is still possible by way of the mesh communication network 22.

<System Clock>

Figure 10:
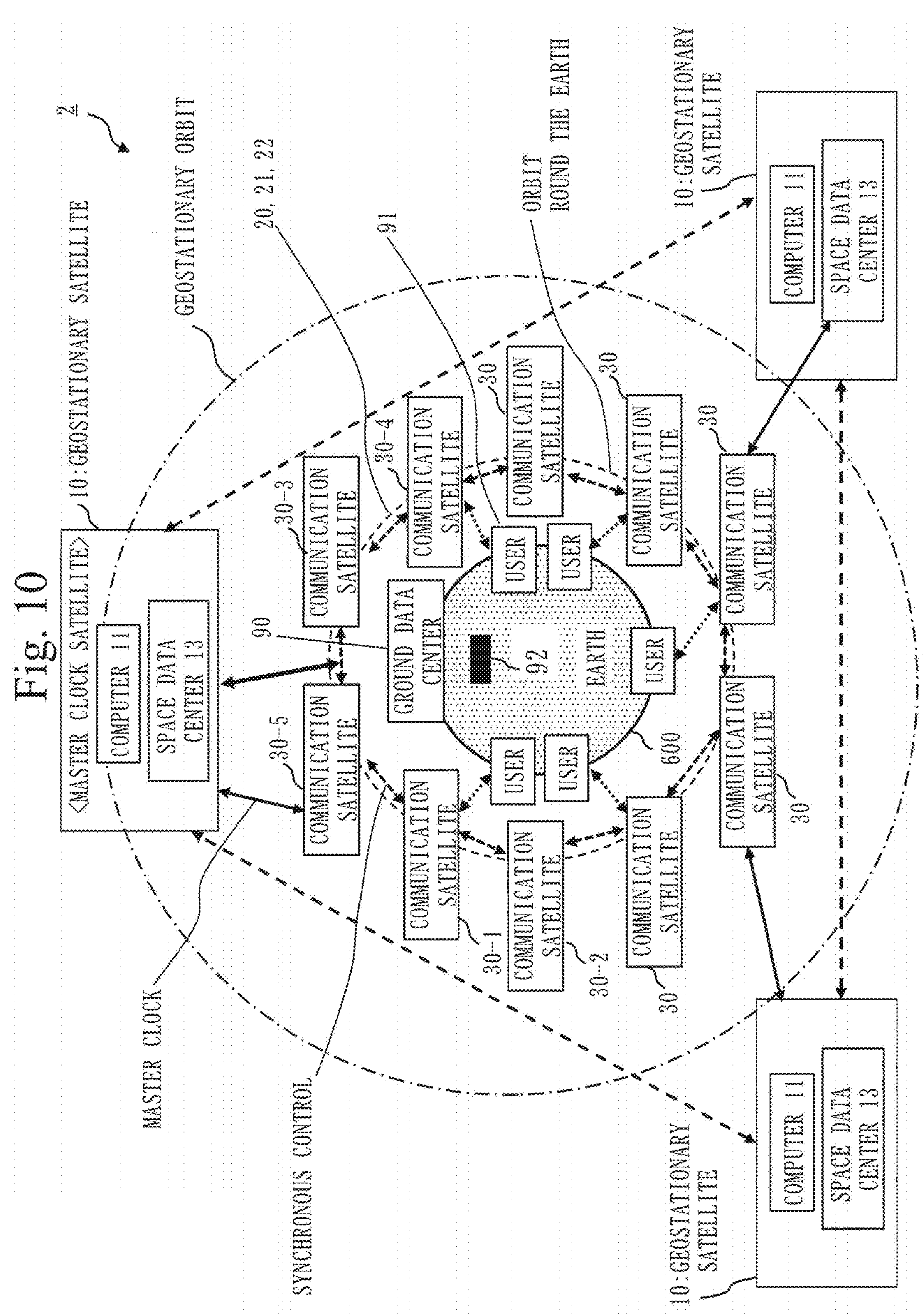
FIG. 10 is a diagram of Embodiment 1, showing a configuration in which the edge computing system 2 includes a geostationary satellite 10-1 functioning as a master clock satellite.

FIG. 10 shows a configuration in which the edge computing system 2 includes a geostationary satellite 10-1 functioning as a master clock satellite. The geostationary satellite 10-1 carries a high-precision clock for synchronous control and uses the high-precision clock to execute synchronous control of the multiple communication satellites 30 included in the low earth orbiting satellite constellation 20. The geostationary satellite 10-1 performs synchronous control on a communication satellite 30-5. Other communication satellites 30 different from the communication satellite 30-5 can receive synchronous control via the mesh communication network 22 and the communication satellite 30-5.

The edge computing system 2 according to FIG. 10 has the effect of enabling precise time management through synchronous control signals transmitted by a master clock satellite, even if the individual satellites constituting the constellation are not equipped with high-precision clocks. For example, if synchronous control signals transmitted by the geostationary satellite 10-1 as a master clock satellite are used in an instance where the communication satellites 30 as low earth orbiting satellites are equipped with positioning signal transmitting devices, it has the effect of enabling distribution of high-precision positioning signals by using satellites not equipped with atomic clocks as positioning satellites. Synchronous control among the communication satellites 30 being orbiting satellites is possible using the annular communication network or the mesh communication network. Positioning mission is now described. If a satellite equipped with a high-precision clock, such as an atomic clock and an optical lattice clock, and with a positioning signal transmitting device as a mission device distributes positioning signals, including precise orbit information of the satellite itself, it functions as a positioning satellite in a similar manner to GPS or GNSS such as quasi-zenith positioning satellites. However, since high-precision clocks to serve as master clocks are expensive, there is an issue in that a system with all the satellites equipped with master clocks is costly. Quartz clocks, which are commonly provided on satellites, have poor long-term stability compared to atomic clocks and hence have an issue of causing a time error when operated unattended over a long period of time. So, by calibrating a standard clock with reference to synchronization signals from the master clock while the standard clock maintains a desired time precision, it can keep precise time to enable functioning as a positioning satellite even without a high-precision master clock.

<Position of Ground Data Center 90>

In the edge computing system 2, the ground data center 90 is installed in a high-latitude zone at a latitude of 50 degrees or more.

As a supercomputer or computers making up a large-scale data center have high power consumption and generates much heat, they have been operated in a ground facility equipped with a large-scale cooling facility. In this case, consumption of large electricity and exhaust heat to the outside pose an issue of disadvantage in terms of SDGs. As cloud computing is becoming more popular, locations where a supercomputer or a data center is installed are no longer a constraint for users; as long as fast communication lines are ensured, it is rational to deploy equipment that consumes large electricity and generates much heat in a high latitude region, or a cold area. On the other hand, when an optical fiber communication network or the like is to be laid on the ground, routing a high capacity communication network from a high latitude region to a metropolitan area where users are concentrated has the issue of being disadvantageous in terms of cost. As opposed to this, a hybrid constellation which is formed at an orbit altitude of about 350 km, for example, and forms an annular or mesh communication network of optical communication terminals has the effect of facilitating provision of an information communication network from a high latitude region to a metropolitan area and achieving low latency. Further, since a polar orbit satellite passes over a polar region in every revolution, it has the effect of facilitating expansion of communication capacity for a high latitude region, including a polar region. In an inclined orbit satellite as well, the forwarding direction of a satellite that moves up northward from the south hemisphere changes at the northern extremity of the orbital plane to a direction in which the satellite flies from west to cast and moves down southward from the north hemisphere, and the forwarding direction of a satellite that moves down southward from the north hemisphere changes at the southern extremity of the orbital plane to a direction in which the satellite flies from west to east and moves up northward from the south hemisphere. So, an orbit with an orbital inclination of 50 degrees or more has the effect of facilitating expansion of the capacity of communication with a ground facility installed in a high latitude region, including the polar region, at the northern extremity and the southern extremity of the orbital plane in a region where the satellite flies from west to east.

Further, by limiting a communication line with a data center installed in a high latitude region to a communication line with communication satellites having robust security measures and eliminating land lines, the effect of enabling construction of a data center with a robust security environment blocked from cyber attacks is provided.

<Optical Communication>

In the edge computing system 2, inter-satellite optical communication can be used at least either between the geostationary satellite 10 and each communication satellite 30 of the multiple communication satellites 30 included in the low earth orbiting satellite constellation 20 or between communication satellites 30 of the multiple communication satellites 30 included in the low earth orbiting satellite constellation 20.

Optical communication has the effect of allowing high-capacity communication and also causing no concern of frequency interference with nearby satellites.

FIG. 11 shows a configuration in which the edge computing system 2 monitors a moving object.

The edge server 32 mounted on the communication satellite 30-1 stores preliminary information 45, which is moving object attribute information for a moving object being a monitoring target, as a moving object model. Here, one or more communication satellites 30 of the multiple communication satellites included in the low earth orbiting satellite constellation 20 are equipped with the synthetic aperture radar 42. The communication satellite 30-1 stores moving object monitoring information acquired by the synthetic aperture radar 42 in the edge server 32 of the communication satellite 30-1. The computer 31 of the communication satellite 30-1 identifies a moving object as a monitoring target by referencing the moving object monitoring information and the moving object model (preliminary information 45) stored in the edge server 32. Then, the computer 31 sends position information including the position of the identified moving object and the time of position acquisition to a surveillance satellite, which is a communication satellite 30 that is capable of monitoring the position indicated by the position information and is included in the multiple communication satellites 30 included in the low earth orbiting satellite constellation 20. This surveillance satellite is assumed to be the communication satellite 30-3. Upon receiving the position information, the communication satellite 30-3 as a surveillance satellite stores acquired information, which is the result of monitoring of the moving object as the monitoring target, in the edge server 32 mounted on the communication satellite 30-3. The synthetic aperture radar 42 of the communication satellite 30-3 acquires position information for the moving object. The computer 31 of the communication satellite 30-3 sends the position information for the moving object which has been acquired by the synthetic aperture radar 42 of the communication satellite 30-1 and the synthetic aperture radar 42 of the communication satellite 30-3 and stored in the edge server 32 of the communication satellite 30-3 to the ground via the mesh communication network 22 and the geostationary satellite 10. Here, the "ground" to which the position information for the moving object is sent is the ground data center 90, for example.

FIG. 11 is as follows. An example of identifying and tracking a particular ship as a monitoring target among ships sailing in Japan's waters is described. If the particular ship is an aircraft carrier, for example, key specifications such the length and shape of the ship are collected in advance and features in acquired information that would be acquired in monitoring with a synthetic aperture radar, for example, reflection characteristics of a bridge and a deck and the position of the bridge with respect to the total length, can be analyzed beforehand. Further, the location of the harbor in which the particular ship anchors at normal times can be determined from monitoring information, and these items of preliminary information are stored in the edge server as a moving object model. By imaging of information acquired by the synthetic aperture radar provided on the communication satellite 30 as an orbiting satellite, the particular ship can be identified by assessing the total length, the position of the bridge, the reflection characteristics, and the like against the moving object model that is pre-stored in the edge server. If the particular ship is found at a location different from the location of the harbor in which it anchors at normal times in information acquired by the orbiting satellite, the time and location it was found are stored in the edge server and they are sent to a following orbiting satellite that is scheduled to pass in its vicinity. The following orbiting satellite similarly repeats the operations of identifying the particular ship, storing the time and location it was found in the edge server, and sending them to a following orbiting satellite that is scheduled to pass in its vicinity. By chronologically organizing the times and locations of the particular ship acquired by multiple orbiting satellites, tracking information is formed. After the series of operations above are performed by automated processing on the orbits without sending and receiving information to/from a ground system, only tracking information is sent to ground users. As a result, the particular ship can be tracked on the orbits and tracking information can be sent to users without burden of ground processing.

<Supplementary Note on Satellite Hardware Configuration>

Figure 12:
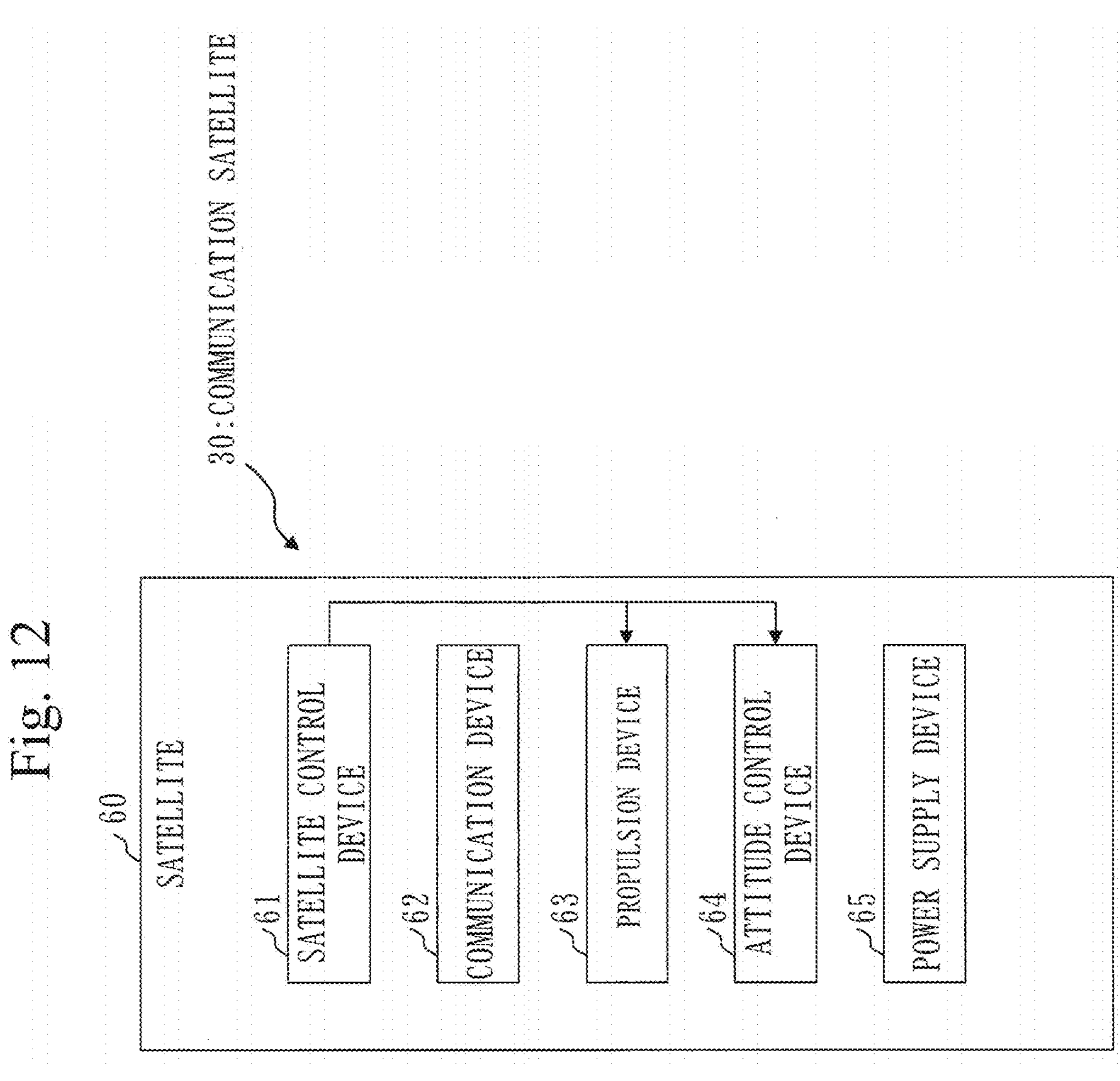
FIG. 12 is a diagram of Embodiment 1, showing a hardware configuration in a case where a satellite 60 is a communication satellite 30.

FIG. 12 shows a hardware configuration in a case where a satellite 60 is a communication satellite 30. Referring to FIG. 12, the hardware configuration of the communication satellite 30 is described.

The satellite 60 includes a satellite control device 61, a communication device 62, a propulsion device 63, an attitude control device 64, and a power supply device 65. While it may include other components for implementing various functions, in FIG. 12, the satellite control device 61, the communication device 62, the propulsion device 63, the attitude control device 64, and the power supply device 65 are described.

(1) The satellite control device 61 is a computer to control the propulsion device 63 and the attitude control device 64 and includes a processing circuit. Specifically, the satellite control device 61 controls the propulsion device 63 and the attitude control device 64 in accordance with various commands transmitted from the ground facility 700.

(2) The communication device 62 corresponds to the first communication device 51C, the second communication device 52C, the third communication device 53C, the fourth communication device 54C, and the ground communication device 55C.

(3) The propulsion device 63 is a device to give thrust to the satellite 60 and changes the speed of the satellite 60.

(4) The attitude control device 64 is a device to control attitude elements, such as the attitude of the satellite 60, and the angular speed and line of sight of the satellite 60. The attitude control device 64 changes each attitude element in a desired direction. Alternatively, the attitude control device 64 maintains each attitude element in a desired direction. The attitude control device 64 includes an attitude sensor, an actuator, and a controller. The attitude sensor is a device such as a gyroscope, an earth sensor, a sun sensor, a star tracker, a thruster, and a magnetic sensor. The actuator is a device such as an attitude control thruster, a momentum wheel, a reaction wheel, and a control moment gyro. The controller controls the actuator in accordance with measurement data from the attitude sensor or various commands from the ground facility 700.

(5) The power supply device 65 includes units such as a solar cell, a battery, and a power control device and supplies electric power to the units mounted on the satellite 60.

The processing circuit included in the satellite control device 61 is described. The processing circuit may be dedicated hardware or may be a processor that executes programs stored in the memory. In the processing circuit, some of the functions may be implemented in dedicated hardware and the remaining functions may be implemented in software or firmware. That is, the processing circuit can be embodied by hardware, software, firmware, or a combination thereof. Dedicated hardware is, specifically, a single circuit, a composite circuit, a programmed processor, a parallel-programmed processor, an ASIC, an FPGA, or a combination thereof. ASIC is an abbreviation for Application Specific Integrated Circuit. FPGA is an abbreviation for Field Programmable Gate Array.

Figure 13:
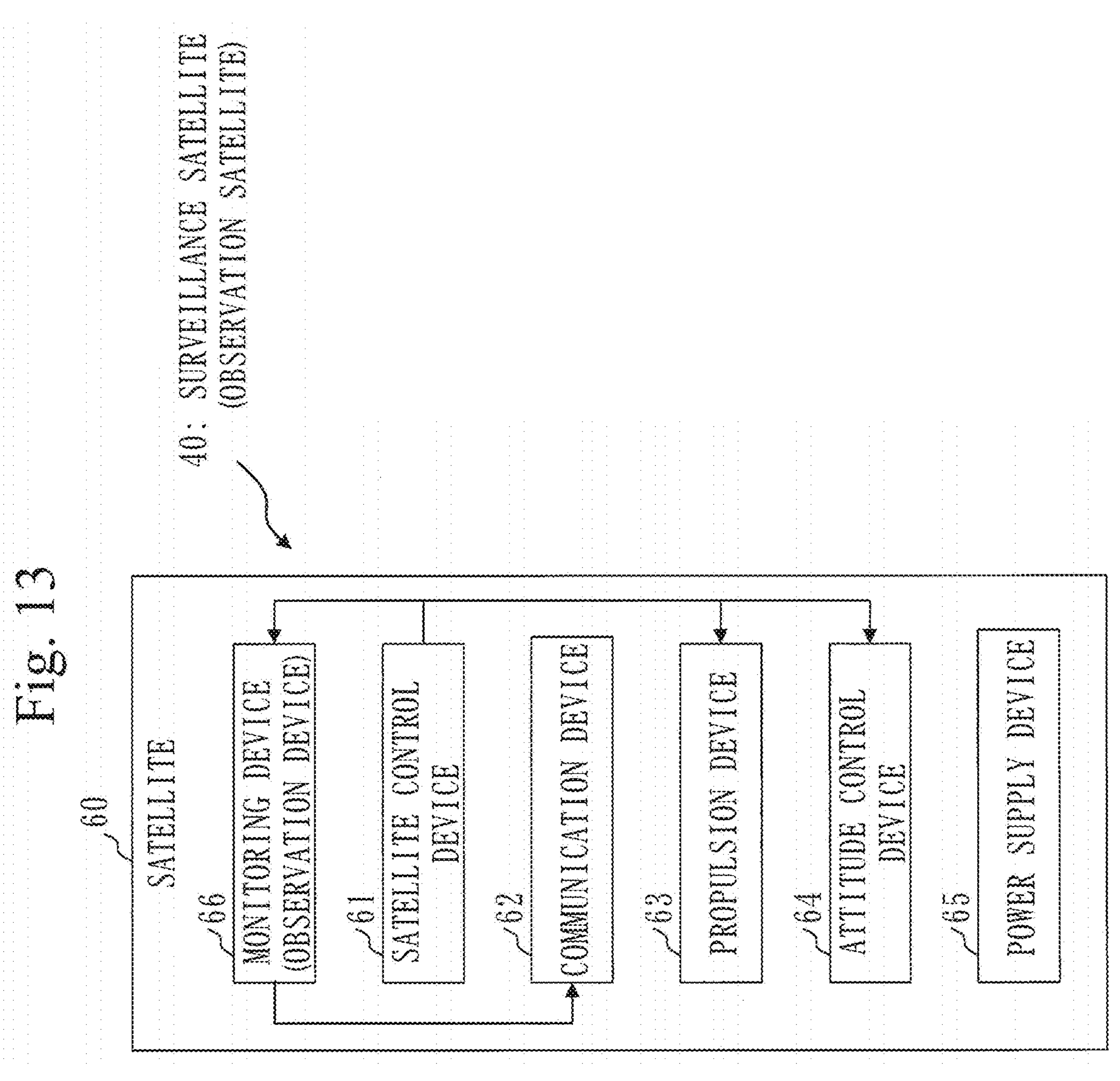
FIG. 13 is a diagram of Embodiment 1, showing a hardware configuration in a case where the satellite 60 is a surveillance satellite 40 or an observation device satellite.

FIG. 13 shows a hardware configuration in a case where the satellite 60 is a surveillance satellite 40 or an observation satellite. The satellite 60 is assumed to be a surveillance satellite 40 below. In the case of an observation satellite, the satellite 60 has an observation device. The satellite 60 of FIG. 13 includes a monitoring device 66 in addition to the configuration of FIG. 12. The monitoring device 66 is a device to monitor objects. Specifically, the monitoring device 66 is a device to monitor or observe objects, such as space objects, flying objects, or moving objects on land, in sea, or in air. The monitoring device 66 is also called an observation device. For example, the monitoring device 66 is an infrared monitoring device that uses infrared radiation to detect a temperature rise caused by atmosphere friction when a flying object enters the atmosphere. The monitoring device 66 detects plume upon launch of a flying object or the temperature of the flying object itself. Alternatively, the monitoring device 66 may be an information collecting device based on lightwaves or radio waves. The monitoring device 66 may also be a device that detects objects with an optical system. The monitoring device 66 uses the optical system to capture images of an object that is flying at an altitude different from the orbit altitude of the observation satellites. Specifically, the monitoring device 66 may be a visible optical sensor.

<Hardware Configuration of Ground Facility 700>

FIG. 14 shows a hardware configuration of the ground facility 700. The ground facility 700 performs communications with the surveillance satellite 40 and the communication satellites 30 constituting the low earth orbiting satellite constellation 20, and controls the operations of the communication satellites 30 and the surveillance satellite 40. A ground data center [920] 90 has the same configuration as the ground facility 700. The ground facility 700 is connected with a ground-side communication device 810 and the ground facility 700 communicates with the satellite 60 via the ground-side communication device 810. The ground facility 700 may include a mobile terminal.

The ground facility 700 forms the low earth orbiting satellite constellation 20 by communicating with the individual satellites 60. The ground facility 700 includes a processor 710 and also other pieces of hardware such as a main storage device 720, an auxiliary storage device 730, an input interface 740, an output interface 750, and a communication interface 760. In FIG. 14, interface is denoted as IF. The processor 710 is connected with the other pieces of hardware via a signal line 770 and controls the other pieces of hardware.

The ground facility 700 includes a control unit 711 as a functional element. Functions of the control unit 711 are implemented by hardware or a program, which is software. A program for implementing the functions of the control unit 711 is stored in the auxiliary storage device 730. This program may be provided being stored on a computer-readable recording medium or may be provided as a program product.

Embodiment 1 has been described above. One of the multiple technical features of Embodiment 1 may be partially practiced or two or more technical features of the multiple technical features of Embodiment 1 may be practiced in combination.

REFERENCE SIGNS LIST

1: cloud computing system; 2: edge computing system; 10: geostationary satellite; 11: computer; 12: cloud data center; 13: space data center; 18: earth-oriented plane; 19: counter-earth-oriented plane; 20: low earth orbiting satellite constellation; 21: annular communication network; 22: mesh communication network; 30: communication satellite; 31: computer; 32: edge server; 33: fore-aft communication device; 34: right-left communication device; 39: orbit information; 40: surveillance satellite; 41: monitoring device; 42: synthetic aperture radar; 43: optical observation device; 44: flying object information; 45: preliminary information; 51: communication visual field; 51C: first communication device; 52: communication visual field; 52C: second communication device; 53: communication visual field; 53C: third communication device; 54: communication visual field; 54C: fourth communication device; 55C: ground communication device; 60: satellite; 61: satellite control device; 62: communication device; 63: propulsion device; 64: attitude control device; 65: power supply device; 66: monitoring device; 71: communication link; 72: communication link; 90: ground data center; 91: user terminal; 92: coping asset; 600: the earth; 700: ground facility; 710: processor; 720: main storage device; 730: auxiliary storage device; 740: input interface; 750: output interface; 760: communication interface; 770: signal line; 810: ground-side communication device

The invention claimed is:

1. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, the computer is equipped with artificial intelligence, the edge server stores orbit information for the plurality of satellites included in the low earth orbiting satellite constellation, and the computer mounted on the satellite with the edge server analyzes a risk of collision between satellites of the plurality of satellites included in the low earth orbiting satellite constellation, from the orbit information for the plurality of satellites stored in the edge server using the artificial intelligence.

2. The edge computing system according to claim 1, wherein the geostationary satellite carries a high-precision clock for synchronous control and uses the high-precision clock to execute synchronous control of the plurality of satellites included in the low earth orbiting satellite constellation.

3. The edge computing system according to claim 1, wherein the ground data center is installed in a high-latitude zone at a latitude of 50 degrees or more.

4. The edge computing system according to claim 1, wherein inter-satellite optical communication is used at least either between the geostationary satellite and each satellite of the plurality of satellites included in the low earth orbiting satellite constellation or between satellites of the plurality of satellites included in the low earth orbiting satellite constellation.

5. The edge computing system according to claim 1, wherein the low earth orbiting satellite constellation is a communication satellite constellation that communicates with a ground facility installed in a high-latitude zone at a latitude of 50 degrees or more.

6. The edge computing system according to claim 1, wherein the space data center processes a portion of data processing for the ground data center on a geostationary orbit.

7. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, the computer is equipped with artificial intelligence, the low earth orbiting satellite constellation is capable of communicating with a surveillance satellite having a monitoring device to acquire flying object information mounted thereon, the edge server stores orbit information for the plurality of satellites included in the low earth orbiting satellite constellation and the flying object information acquired by the monitoring device of the surveillance satellite, and the computer mounted on the satellite with the edge server sends the flying object information stored in the edge server to the satellite included in the low earth orbiting satellite constellation by referencing the orbit information.

8. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, the computer is equipped with artificial intelligence, the low earth orbiting satellite constellation is capable of communicating with a plurality of surveillance satellites each having a monitoring device to acquire flying object information mounted thereon, the edge server acquires and stores the flying object information from the plurality of surveillance satellites and also stores preliminary information as flying object attribute information, and the computer mounted on the satellite with the edge server calculates a predicted flying path of a flying object by executing flying path analysis with the artificial intelligence using the flying object information and the preliminary information stored in the edge server, and sends the flying object information stored in the edge server to a surveillance satellite that can track the predicted flying path.

9. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, the computer is equipped with artificial intelligence, the low earth orbiting satellite constellation is capable of communicating with a plurality of surveillance satellites each having a monitoring device to acquire flying object information mounted thereon, the edge server acquires and stores the flying object information from the plurality of surveillance satellites and also stores preliminary information as flying object attribute information, and the computer mounted on the satellite with the edge server executes prediction of flying object landing with the artificial intelligence using the flying object information and the preliminary information stored in the edge server, selects a satellite that can send the flying object information to a coping asset that is capable of coping from the plurality of satellites included in the low earth orbiting satellite constellation by referencing a result of the prediction of flying object landing, and makes the selected satellite transmit the flying object information to the coping asset capable of coping.

10. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, one or more satellites of the plurality of satellites included in the low earth orbiting satellite constellation are observation satellites which are equipped with a synthetic aperture radar and which store radar-acquired information acquired by the synthetic aperture radar in the edge server, and the computer mounted on the satellite with the edge server uses the radar-acquired information acquired by the synthetic aperture radar to perform image generation by synthetic aperture processing which processes the radar-acquired information on an orbit, and sends image data generated in the image generation to the ground data center.

11. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, at least either of the geostationary satellite and one or more satellites of the plurality of satellites included in the low earth orbiting satellite constellation is an observation satellite that is equipped with an optical observation device and that stores optically acquired information acquired by the optical observation device in the edge server, and the computer mounted on the satellite with the edge server uses the optically acquired information acquired by the optical observation device to perform image generation by super-resolution processing on an orbit, and sends image data generated in the image generation to the ground data center.

12. An edge computing system comprising:

a geostationary satellite having a computer and a space data center mounted thereon;

a low earth orbiting satellite constellation having a plurality of satellites and including a satellite with an edge server and a computer mounted thereon among the plurality of satellites; and a ground data center deployed on ground, wherein in the low earth orbiting satellite constellation, an annular communication network is formed by equipping each one of a plurality of satellites that fly on a same orbital plane with a fore-aft communication device that communicates with front and rear satellites in a forwarding direction, and a mesh communication network in which adjacent ones of such annular communication networks are communicably connected with each other is formed by equipping each one of the plurality of satellites that fly on the same orbital plane with a right-left communication device that communicates with both a left-side satellite flying in a left adjacent orbit and a right-side satellite flying in a right adjacent orbit, the low earth orbiting satellite constellation is a communication satellite constellation, the edge server stores preliminary information as a moving object model, the preliminary information being moving object attribute information for a moving object as a monitoring target, one or more satellites of the plurality of satellites included in the low earth orbiting satellite constellation are equipped with a synthetic aperture radar and store moving object monitoring information acquired by the synthetic aperture radar in the edge server, the computer mounted on the satellite with the edge server identifies a moving object as a monitoring target by referencing the moving object monitoring information and the moving object model stored in the edge server, and sends position information indicating a position of the identified moving object to a surveillance satellite, which is a satellite that is capable of monitoring the position indicated by the position information and is included in the plurality of satellites included in the low earth orbiting satellite constellation, upon receiving the position information, the surveillance satellite stores acquired information in the edge server, the acquired information being a result of monitoring of the moving object as the monitoring target, and the computer sends times and position information for the moving object which have been acquired by a plurality of surveillance satellites and stored in the edge server to the ground data center.

* * * * *